(12) United States Patent
Deogun et al.

(10) Patent No.: US 11,395,334 B2
(45) Date of Patent: Jul. 19, 2022

(54) MULTIPLE GRANT SCHEDULING FOR HYBRID AUTOMATIC REPEAT REQUEST (HARQ) AND RANDOM ACCESS

(71) Applicant: QUALCOMM INCORPORATED, San Diego, CA (US)

(72) Inventors: Pravjyot Singh Deogun, Bengaluru (IN); Kapil Bhattad, Bangalore (IN); Ozcan Ozturk, San Diego, CA (US); Jing Sun, San Diego, CA (US); Xiaoxia Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/890,969

(22) Filed: Jun. 2, 2020

(65) Prior Publication Data
US 2021/0014890 A1  Jan. 14, 2021

(30) Foreign Application Priority Data

Jul. 12, 2019  (IN) .............................. 201941028036

(51) Int. Cl.
*H04W 74/08* (2009.01)
*H04W 16/14* (2009.01)
(Continued)

(52) U.S. Cl.
CPC ....... *H04W 74/0808* (2013.01); *H04L 1/1819* (2013.01); *H04W 16/14* (2013.01); *H04W 72/14* (2013.01)

(58) Field of Classification Search
CPC . H04W 74/0808; H04W 16/14; H04W 72/14; H04W 72/1289; H04W 74/006; H04L 1/1819; H04L 1/1822; H04L 1/1887
See application file for complete search history.

(56) References Cited

U.S. PATENT DOCUMENTS

| 2015/0131536 A1* | 5/2015 | Kaur | .................. H04L 27/0006 370/329 |
| 2017/0048884 A1* | 2/2017 | Jung | ...................... H04L 5/001 |

(Continued)

FOREIGN PATENT DOCUMENTS

| WO | 2017074638 A1 | 5/2017 |
| WO | 2017160343 A1 | 9/2017 |

(Continued)

OTHER PUBLICATIONS

International Search Report and Written Opinion—PCT/US2020/036043—ISA/EPO—dated Aug. 26, 2020.

*Primary Examiner* — Mandish K Randhawa
(74) *Attorney, Agent, or Firm* — Haynes and Boone, LLP (36340)

(57) ABSTRACT

Wireless communications systems and methods related to multi-grant scheduling are provided. A user equipment (UE) receives, from a base station (BS), an uplink (UL) scheduling grant indicating one or more transmission occasions. The UE performs a category 2 (CAT2) listen-before-talk (LBT) based on the one or more transmission occasions being within a channel occupancy time (COT) of the BS. The UE transmits one or more UL transmissions during the one or more transmissions occasions based on the CAT2 LBT.

29 Claims, 18 Drawing Sheets

(51) Int. Cl.
*H04L 1/18* (2006.01)
*H04W 72/14* (2009.01)

(56) References Cited

U.S. PATENT DOCUMENTS

| | | | |
|---|---|---|---|
| 2017/0302493 A1 | 10/2017 | Yang et al. | |
| 2018/0124749 A1* | 5/2018 | Park | H04W 74/08 |
| 2019/0090235 A1* | 3/2019 | Hu | H04W 74/006 |
| 2020/0187249 A1* | 6/2020 | Yang | H04L 1/1887 |
| 2021/0127407 A1* | 4/2021 | Shapin | H04L 1/0068 |

FOREIGN PATENT DOCUMENTS

| | | |
|---|---|---|
| WO | 2018075745 A1 | 4/2018 |
| WO | 2018198092 A1 | 11/2018 |

* cited by examiner

MULTIPLE GRANT SCHEDULING FOR HYBRID AUTOMATIC REPEAT REQUEST (HARQ) AND RANDOM ACCESS

CROSS REFERENCE TO RELATED APPLICATIONS

The present application claims priority to and the benefit of the Indian Provisional Patent Application No. 201941028036, filed Jul. 12, 2019, which is hereby incorporated by reference in its entirety as if fully set forth below and for all applicable purposes.

TECHNICAL FIELD

This application relates to wireless communication systems, and more particularly to multi-grant scheduling for random access and hybrid automatic repeat request (HARQ) communications in a shared radio frequency spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an uplink (UL) transmission in an unlicensed frequency band. The UE may perform an LBT procedure prior to the scheduled time. When the LBT is a success, the UE may proceed to transmit UL data according to the schedule. When the LBT fails, the UE may refrain from transmitting. In some instances, the LBT may pass at a later time within the scheduled period. When the LBT success is delayed into the scheduled period, the UE may transmit in the remaining time of the scheduled period by puncturing a portion of the UL data. Thus, depending on the LBT result, the UE may or may not transmit the UL data as scheduled. Additionally, the puncturing can degrade the decoding performance of the UL data at the BS.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE). The method includes receiving, from a base station (BS), an uplink (UL) scheduling grant indicating one or more transmission occasions; performing a category 2 (CAT2) listen-before-talk (LBT) based on the one or more transmission occasions being within a channel occupancy time (COT) of the BS; and transmitting one or more UL transmissions during the one or more transmission occasions based on the CAT2 LBT.

In an additional aspect of the disclosure, a user equipment (UE) includes a transceiver configured to receive, from a base station (BS), an uplink (UL) scheduling grant indicating one or more transmission occasions; and transmit one or more UL transmissions during the one or more transmission occasions based on a category 2 (CAT2) listen-before-talk (LBT); and a processor configured to perform the CAT2 LBT based on the one or more transmission occasions being within a channel occupancy time (COT) of the BS.

In an additional aspect of the disclosure, a non-transitory computer-readable medium having program code recorded thereon, the program code includes code for causing a user equipment (UE) to receive, from a base station (BS), an uplink (UL) scheduling grant indicating one or more transmission occasions; code for causing the UE to perform a category 2 (CAT2) listen-before-talk (LBT) based on the one or more transmission occasions being within a channel occupancy time (COT) of the BS; and code for causing the UE to transmit one or more UL transmissions during the one or more transmission occasions based on the CAT2 LBT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
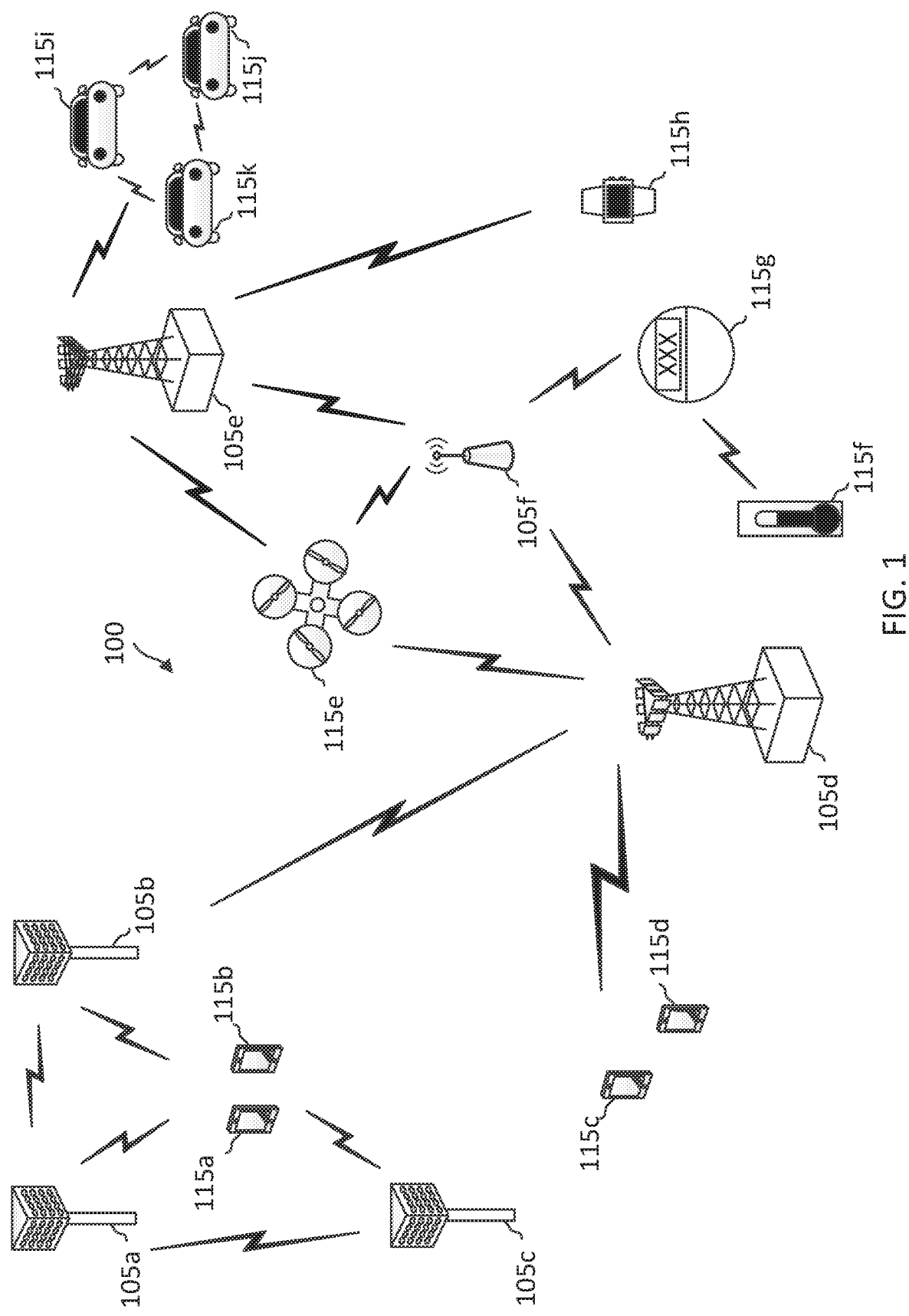
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for random access scheduling and/or HARQ process scheduling with multiple grants in a radio frequency spectrum (e.g., a shared frequency band or an unlicensed frequency band) shared by multiple network operating entities. For random access scheduling, a BS may grant a UE with multiple transmission occasions for transmitting a random access message. The BS may configure the UE with repetition rules for repeating the transmission of random message in the multiple transmission occasions. The repetition rules may indicate a number of repetitions for the random access message transmission. The repetition rules may restrict the repetitions to be within a single burst (e.g., in contiguous transmission occasions). The repetition rules may indicate a threshold for determining whether a repeated transmission is required after a previous punctured transmission. For example, the UE may perform an LBT prior to transmitting a transmission occasion and the LBT fails at the beginning of a transmission occasion, but passes at a later time within the transmission occasion. The UE may transmit a random access message in the remaining time of the transmission occasion by applying puncturing. When the punctured duration exceeds the threshold, the UE may repeat the transmission of the random access message in a next transmission occasion. Conversely, when the punctured duration does not exceed the threshold, the UE may not repeat the transmission.

For HARQ process scheduling, a BS may grant a UE with a plurality of transmission occasions for a plurality of HARQ processes and may indicate an association between the plurality of transmission occasions and the plurality of HARQ processes. The HARQ processes may be independent from each other. Each HARQ process can be identified by a HARQ process ID. The grant may indicate a number of transmission occasions for each HARQ process. The association may associate each transmission occasion with one of the HARQ processes. In other words, each transmission occasion is designated for a particular HARQ process. The UE may transmit HARQ UL data blocks (e.g., transport blocks) to the BS using one or more of the transmission occasions based on the association. For example, the UE may transmit a HARQ UL data block of a first HARQ process in a transmission occasions designated for the first HARQ process. The UE may perform an LBT prior to transmitting the HARQ block in the designated transmission occasion. For example, if the LBT fails at the beginning of the transmission occasion, but passes at a later time within the transmission occasion, the UE may transmit the HARQ block in the remaining time of the transmission occasion by puncturing a portion of the HARQ block. The UE may then repeat the transmission of the HARQ block in a subsequent transmission occasion designated for the first HARQ process. In some embodiments, each of the transmission occasions may have the same duration. In some embodiments, the transmission occasions may have different durations. For example, the earlier transmission occasions may have a shorter duration than the later transmission occasions. Additionally, the BS may provide a greater number of transmission occasions to a HARQ process granted with the shorter-duration transmission occasion and a lower number of transmission occasions to a HARQ process granted with the longer-duration transmission occasion.

In some embodiments, the BS may perform a category 4 LBT to acquire a channel occupancy time (COT) and schedule multiple transmission occasions for the random access message and/or the HARQ processes within the COT. The BS can detect the start of a UE's random access message transmission and/or HARQ data transmission. For random access, the BS can determine when the UE may complete the random access transmission based on the determined UE's transmission start time and/or repetition rules. For HARQ processing, the BS can determine when the UE may complete the HARQ data transmission based on the determined UE's transmission start time and/or association. The BS may reclaim unused transmission occasions for other UL and/or DL communications.

Aspects of the present application can provide several benefits. For example, the provisions of multiple transmission occasions for a random access message and/or a HARQ process can increase the probability of the UE winning a contention (e.g., a successful LBT) and transmitting the random message and/or the HARQ data successfully. Additionally, the multiple transmission occasions allow the UE to repeat a transmission as needed to increase the probability of a successful decoding at the BS. The inclusion of the repetition rules for random access message transmissions and/or restriction on having the repetitions to be in a single transmission burst minimize interference in the shared channel. Further, the repetitions rules and the single burst transmission restriction can allow the BS to easily reclaim unused transmission occasions based on the UE transmission start time. The inclusion of the associations between HARQ processes and transmission occasions can allow the BS to easily reclaim unused transmission occasions based on the UE transmission start time.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 may communicate data with the UE 115 using HARQ to improve communication reliability.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-unlicensed (NR-U) network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. The LBT may be based on energy detection in the shared channel and/or detection of a particular signal (e.g., a preamble signal). In some examples, the LBT can be a category 4 (CAT4) LBT. A CAT4 LBT refers to an LBT with a random backoff and a variable contention window. In some examples, the LBT can be a category 2 (CAT2) LBT. A CAT2 LBT refers to a one-shot LBT without a random backoff. The transmitting node may determine whether to perform a CAT2 LBT or a CAT4 LBT prior to a transmission based on a transmission gap and/or a link direction switch prior to the intended transmission. For example, when the transmission gap is shorter than 25 microseconds (μs), the transmitting node may perform a CAT2 LBT. Conversely, when the transmission gap is greater than 25 μs, the transmitting node perform a CAT4 LBT. When the LBT is a pass indicating that the shared channel is available, the transmitting node may proceed with the transmission. When the LBT fails indicating that the shared channel is occupied or busy, the transmitting node may refrain from transmitting. In some instances, the transmitting node may retry LBT at a later time (e.g., after a backoff time). Thus, while a BS 105 may schedule UL and/or DL communications with a UE 115 in a shared channel, communications may or may not occur as scheduled due to LBT gating.

In an embodiment, a BS 105 may perform a CAT4 LBT to acquire a channel occupancy time (COT) period. When the LBT passes, the BS 105 may schedule one or more UEs 115 for DL and/or UL communications within the acquired COT period. When a BS 105 schedules a UE 115 for UL transmission within the acquired period, the UE 115 may perform a CAT2 LBT prior to transmitting in the channel. Depending on the LBT results, the UE may or may not transmit as scheduled. To increase the UL transmission success rate, the BS 105 may schedule the UE 115 with multiple UL transmission occasions. In some examples, the BS 105 may grant a UE 115 with multiple transmission occasions for random access message (e.g., MSG3) transmissions and may configure the UE 115 with a repetition rule for repeating the transmission of the random access message in the multiple transmission occasions. In some examples, the BS 105 may grant a UE 115 with multiple transmission occasions for HARQ communications and may indicate an association between the multiple transmission occasions and HARQ processes. Mechanisms for scheduling multiple grants or transmission occasions for random access and HARQ communications are described in greater detail herein.

Figure 2:
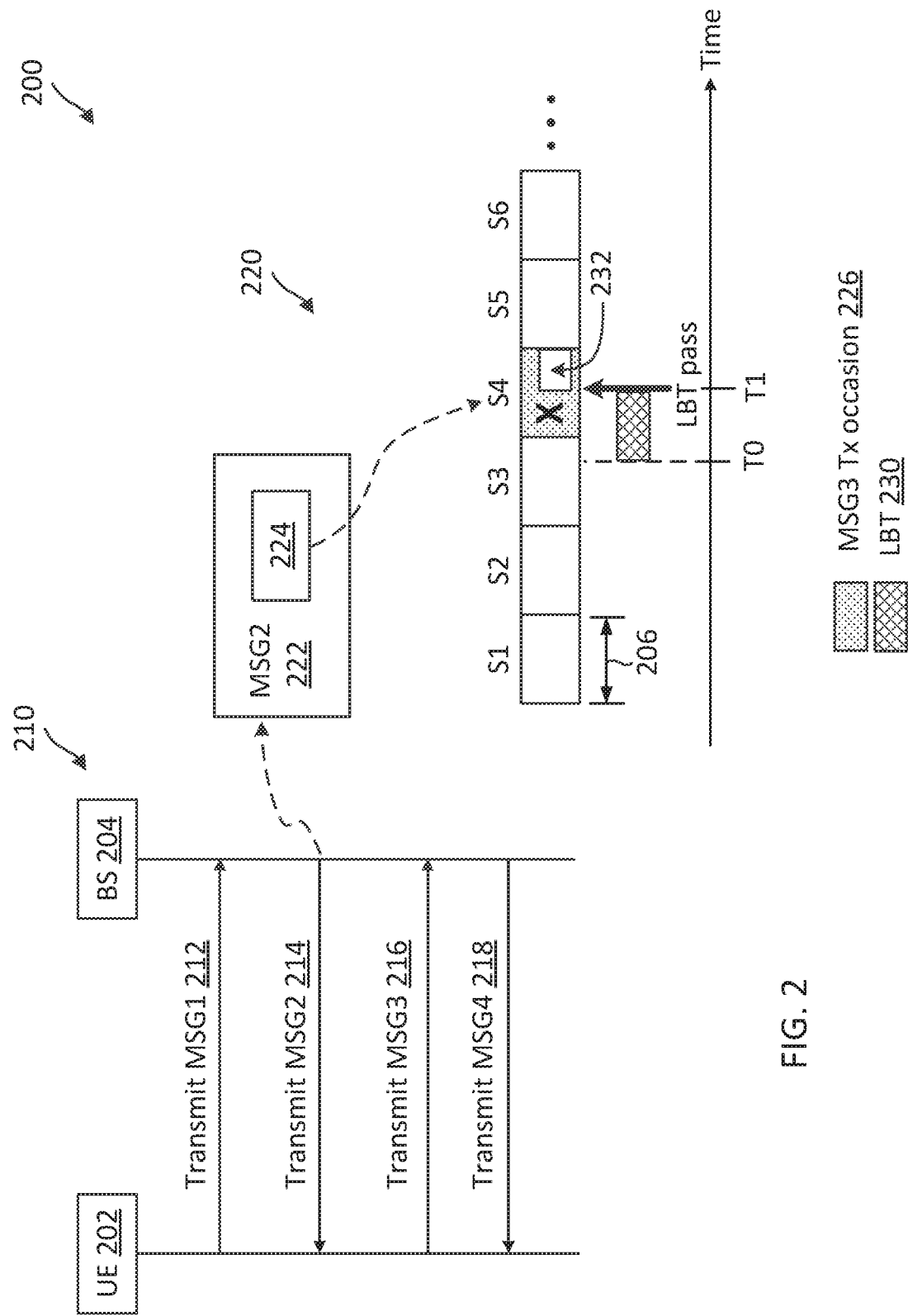
FIG. 2 illustrates a random access scenario in a shared radio frequency band according to some embodiments of the present disclosure.

FIG. 2 illustrates a random access scenario 200 in a shared radio frequency band according to some embodiments of the present disclosure. The scenario 200 may correspond to a random access scenario in the network 100 when the network 100 operates over a shared frequency band or an unlicensed frequency band. The scenario 200 includes a signaling diagram illustrating a random access method 210 and a random message transmission scenario 220 impacted by LBT. In the scenario 220, the x-axis represents time in some arbitrary units.

The method 210 is implemented between a BS 204 (e.g., the BSs 105) and a UE 202 (e.g., the UEs 115). As illustrated, the method 210 includes a number of enumerated steps, but embodiments of the method 210 may include additional steps before, after, and in between the enumerated steps. In some embodiments, one or more of the enumerated steps may be omitted or performed in a different order. The method 210 illustrates one BS 204 and one UE 202 for purposes of simplicity of discussion, though it will be recognized that embodiments of the present disclosure may scale to many more UEs 202 and/or BSs 204.

At step 212, the UE 202 transmits a MSG1 to initiate a network access. The MSG1 may include a physical random access preamble signal. The UE 202 may generate the random access preamble signal according to a physical random access channel (PRACH) configuration (e.g., the sequence and format information) provided by the BS 204, for example, via system information broadcast.

At step 214, upon detecting MSG1, the BS 204 transmits a MSG2 (e.g., a RAR) to the UE 202. The MSG2 is shown as a MSG2 222 in the scenario 220. The BS 204 may determine UL transmission timing associated with the UE 202 based on the reception of the MSG1. The BS 204 may assign a resource for the UE 202 to transmit a subsequent MSG3. The MSG2 may include the UL timing adjustment information, a grant (e.g., indicating the resource(s)) for a subsequent MSG3 transmission, and/or any other information (e.g., a temporary identifier for the UE 202) to facilitate a connection establishment with the UE 202. The grant for the MSG3 transmission is shown as a grant 224 in the scenario 220.

At step 216, upon receiving MSG2, the UE 202 transmits a MSG3 using the resource(s) indicated by the grant. The MSG3 may be transmitted in the form of a transport block (TB) carrying UE data. The content of the UE data may vary depending on the embodiments. For example, the MSG3 may include a connection request during an initial network access. Alternatively, the MSG3 may include a handover (HO) complete status during a HO procedure. The MSG3 is shown as a MSG3 232 in the scenario 220.

At step 216, upon receiving the MSG3, the BS 204 may respond by transmitting a MSG4. The MSG4 may indicate a contention resolution in the network. In an example, the transmission of the MSG1 (e.g., the physical random access preamble signal) at step 212 is a contention-based random access for initial network access or HO. The contention resolution in MSG4 indicates that the contention-based initial network access or HO is successful. It should be noted that the contention-based random access preamble signal transmission is separated from the LBT 230 described below.

As described above, when a network operates over a shared channel (e.g., a shared frequency band or an unlicensed frequency band), a transmitting node may perform an LBT prior to transmitting in the shared channel. Thus, the BS 204 or the UE 202 may perform an LBT prior to each transmission in the method 210. As further described above, while a BS (e.g., the BSs 105 and/or 204) may schedule a UE (e.g., the UEs 115 and/or 202) for communications in a shared channel using substantially similar mechanisms as in a licensed frequency band, the communication can be gated by LBT. The scenario 220 illustrates the impact of LBT gating on the MSG3 transmission.

In the scenario 220, the BS 204 schedules the UE 202 in units of slots 206. The scenario 220 illustrates six slots 206 (shown as S1, S2, S3, S4, S5, and S6) for purposes of simplicity of discussion, though it will be recognized that embodiments of the present disclosure may scale to many more slots 206. In an example, the slots 206 may correspond to slots in a radio frame. The durations of a radio frame and/or the duration of a slot 206 may vary depending on the embodiments, for example, based on a subcarrier spacing and/or a scheduling granularity. In an example, a radio frame may span a duration of about 10 ms and each slot 206 may span a duration of about 1 ms. In general, each slot 206 may span any suitable time duration.

As an example, the grant 224 indicates a MSG3 transmission (Tx) occasion 226 in the slot S4 206 for the UE 202. In general, the MSG3 transmission occasion 226 may include any suitable time-frequency resource (e.g., a certain RB at a certain time period). Upon receiving the MSG2 222, the UE 202 may perform a LBT 230 at a time T0 prior to the start of the slot S4 206. The LBT 230 can be based on energy detection and/or preamble signal detection. As an example, the LBT 230 may not pass (e.g., the UE 202 detects energy above a specified threshold or detected a channel reservation signal) at the start of the S4 206 as shown by the cross symbol in the beginning portion of the slot S4 206. However, the LBT 230 passes (e.g., the energy detected by UE 202 falls below the threshold or fails to detect a channel reservation signal) at a later time T1 within the slot S4 206. In other words, the shared channel is occupied by another transmission until time T1. Upon detecting a pass for the LBT 230, the UE 202 transmits the MSG3 232 in the remaining time of the slot S4 206 (beginning at time T1).

In an example, the UE 202 may prepare a transport block (TB) carrying information bits of the MSG3 232 prior to the scheduled slot S4 206. The UE 202 may generate the TB with a size that is configured based on a duration of the slot S4 206 and/or other UL transmission parameters (e.g., modulation coding scheme (MCS), allocated RBs, and/or allocated symbols). However, due to the delayed completion time or delayed success of the LBT 230, the UE 202 is required to puncture a portion of the TB in order to fit the transmission of the TB in the remaining time of the slot S4 206. For example, the UE 202 may puncture a beginning portion of the TB corresponding to a subset of symbols at the beginning of the slot 206 (e.g., from the start of the slot S4 206 to time T1). The puncturing can decrease decoding gain and can lead to unsuccessful decoding of the MSG3 232 at the BS 204. Additionally, the decoding of the MSG3 232 can be further impacted by hidden node interference at the BS 204 side. For example, the UE 202 may not be able to detect transmission from other nodes (e.g., BSs 105 and/or 204 and/or UEs 115 and/or 202) that are close to the BS 204. The unsuccessful decoding of MSG3 can have adverse effects. For example, the UE 202 may have to restart the random access procedure, increasing network access latency. The additional transmissions can also create more interferences in the shared channel, reducing spectrum sharing and/or utilization efficiency.

Figure 3:
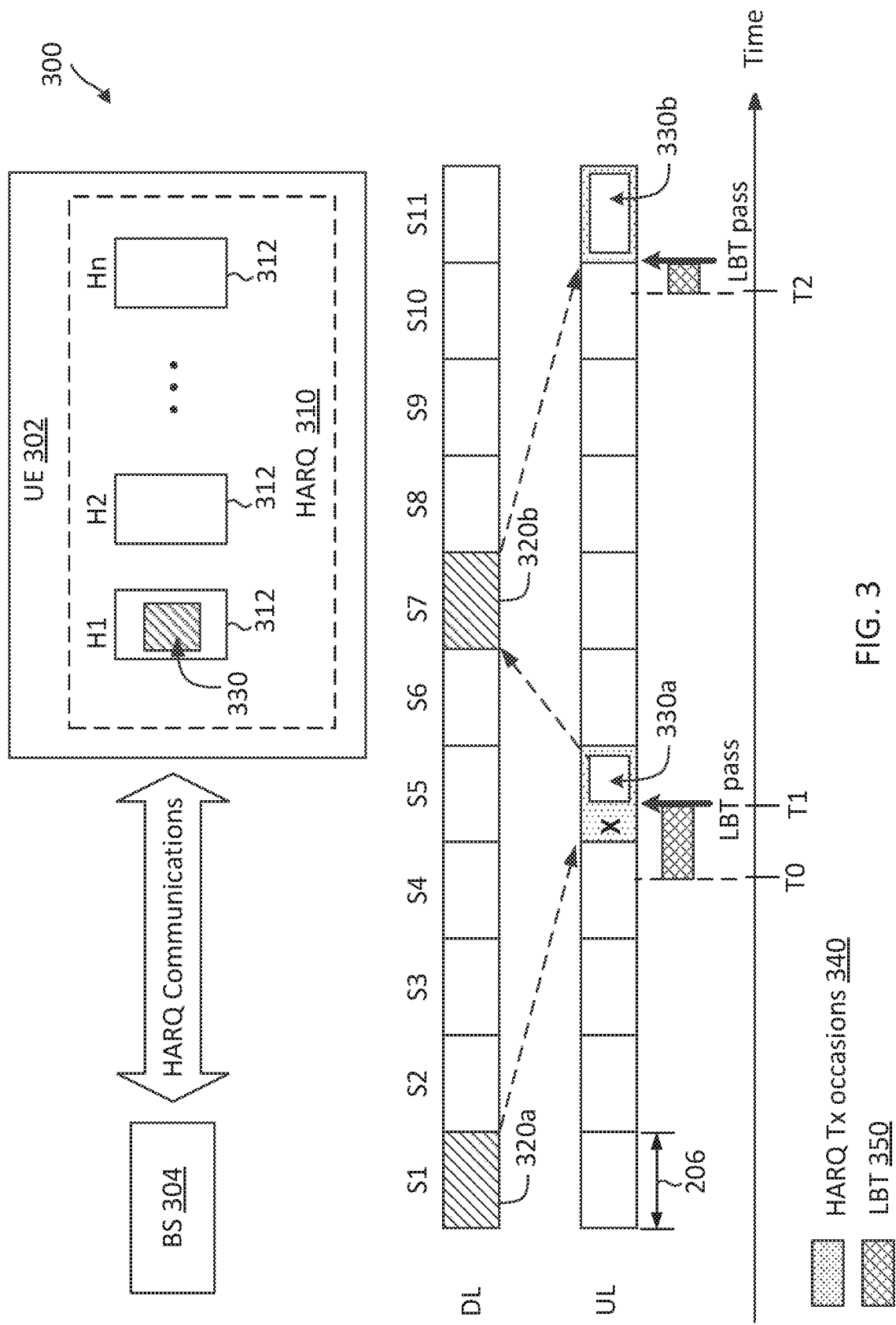
FIG. 3 illustrates a hybrid automatic repeat request (HARQ) communication scenario in a shared radio frequency band according to some embodiments of the present disclosure.

FIG. 3 illustrates a HARQ communication scenario 300 in a shared radio frequency band according to some embodiments of the present disclosure. The scenario 300 may correspond to a HARQ communication scenario in the network 100 when the network 100 operates over a shared frequency band or an unlicensed frequency band. In FIG. 3, the x-axis represents time in some constant units. The scenario 300 is described using a substantially similar slot structure as FIG. 2, and may use the same reference numerals as in FIG. 2 for simplicity sake.

In the scenario 300, a BS 304 (e.g., the BSs 105 and/or 204) may communicate data with a UE 302 (e.g., the UEs 115 and/or 202) using HARQ. For HARQ communications, a transmitting node (e.g., the UE 302) may transmit data (e.g., in the form of a TB) to a receiving node (e.g., the BS 304). The receiving node may provide the transmitting node with a feedback on the reception status of the data. For example, the receiving node may transmit an acknowledgement (ACK) to the transmitting node to indicate a successful decoding of the data. Conversely, the receiving node may transmit a negative-ACK (NACK) to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In an example, the transmitting node may use the same encoding version for the initial transmission and the retransmission. In an example, the transmitting node may use different encoding versions for the initial transmission and the retransmission. In an example, the receiving node may perform soft-combining to decode the data based on the initial transmission and the retransmission. For simplicity of discussion and illustration, FIG. 3 illustrates the HARQ communication in the context of UL data communications, though similar HARQ mechanisms may be applied to DL data communications.

As an example, the UE 302 includes a HARQ component 310. The HARQ component 310 is configured to perform multiple parallel HARQ processes 312 for UL data communications. The HARQ processes 312 may operate independent of each other. In other words, the ACKs, NACKs, and/or retransmissions are determined and processed separately for each HARQ process at the BS 304 and at the UE 302. Each HARQ process 312 may be identified by an HARQ process ID. For example, the HARQ processes 312 may be identified by identifiers H1, H2, . . . Hn. The BS 304 may communicate with the UE 302 in units of slots 206. The slots 206 are shown as S1, S2, . . . , S11. The BS 304 transmits a scheduling grant 320a to the UE 302 in the slot S1 206. The scheduling grant 320a indicates a HARQ transmission (Tx) occasion 340 in the slot S5 206 for the HARQ process H1 312. The UE 302 performs an LBT 350 (e.g., the LBT 230) at time T0 prior to the scheduled slot S5 206. As an example, the LBT 350 fails at the start of the S5 206 as shown by the cross symbol in the beginning portion of the slot S5 206. However, the LBT 350 passes at a later time T1 within the slot S5 206. Upon detecting a pass for the LBT 350, the UE 302 transmits a TB or a HARQ data block 330 (shown as 330a) of the HARQ process H1 312 in the remaining time of the slot S5 206 (beginning at time T1). The data block 330 may include UL data (e.g., PUSCH data) The data block 330a may correspond to a particular encoded version of the data block 330.

Similar to the scenario 200, the UE 302 may prepare the data block 330a prior to the scheduled slot S5 206. Upon detecting that the LBT 350 passes at time T1, the UE 302 may puncture a beginning portion of the data block 330a corresponding to beginning symbols of the slot S5 206 and transmit the punctured data block 330a in the remaining time of the slot S5 206. The puncturing may cause the decoding of the data block 330a to fail at the BS 304. The BS 304 may transmit a NACK to the UE 302 indicating the decoding failure and may schedule the UE 302 to retransmit the data block 330. As shown, the BS 304 transmits another scheduling grant 320b to the UE 302 in slot S7 206. The scheduling grant 320b indicates a HARQ transmission occasion 340 in the slot S11 206 for the UE 302 to retransmit the data block 330. The UE 302 may perform an LBT 350 at time T2 prior to the start of the slot S11 206. For example, the LBT 350 passes at the start of the slot S11 206, and thus the UE 302 retransmits the data block 330 (shown as 330b) in the slot S11 206. The data block 330b may correspond to a particular encoded version of the data block 330. The blocks 330a and 330b may correspond to the same encoded version of the data block 330 or different encoded versions of the data block 330. For example, the BS 304 successfully decodes the data block 330b. Thus, the BS 304 may transmit an ACK to the UE 302 indicating the successful decoding and may subsequently schedule the UE 302 for a new data transmission.

While the scenario 300 illustrates the scheduling and transmission for one HARQ process 312, similar scenarios may occur for communications of different HARQ processes. As can be observed, HARQ data transmission can be gated by LBT. While puncturing can be applied when an LBT success or pass is delayed, puncturing can decrease decoding gain, and thus may increase retransmissions. The increased retransmissions can further impact performance, for example, increasing interferences and/or possibilities of a collision in the shared channel and/or reducing spectrum sharing and/or utilization efficiency.

As can be observed from scenarios 200 and 300, when a network (e.g., the network 100) operates over a shared channel (e.g., a shared frequency band or an unlicensed frequency band), random access and HARQ communication performance can be impacted due to LBT gating. Additionally, the reattempts of random access and/or additional retransmissions for HARQ communications can further increase interferences and/or collisions in the shared channel.

Accordingly, the present disclosure provides techniques for a BS (e.g., the BSs 105, 204, and/or 304) to schedule or grant a UE (e.g., the UEs 115, 202, and/or 302) with multiple transmission occasions in a shared channel (e.g., a shared frequency band and/or an unlicensed frequency band) for random access message transmission and/or HARQ communications. Additionally, the BS may configure repetition rules for random access message and HARQ transmissions and/or association rules between HARQ processes and transmission occasions. The multiple transmission occasions, the repetition rules, and/or the association rules can increase the decoding success probability at the BS and with minimal interference in the shared channel. Mechanisms for scheduling multiple grants or multiple transmission occasions for random access message transmission and HARQ communications are described in greater detail herein below.

Figure 4:
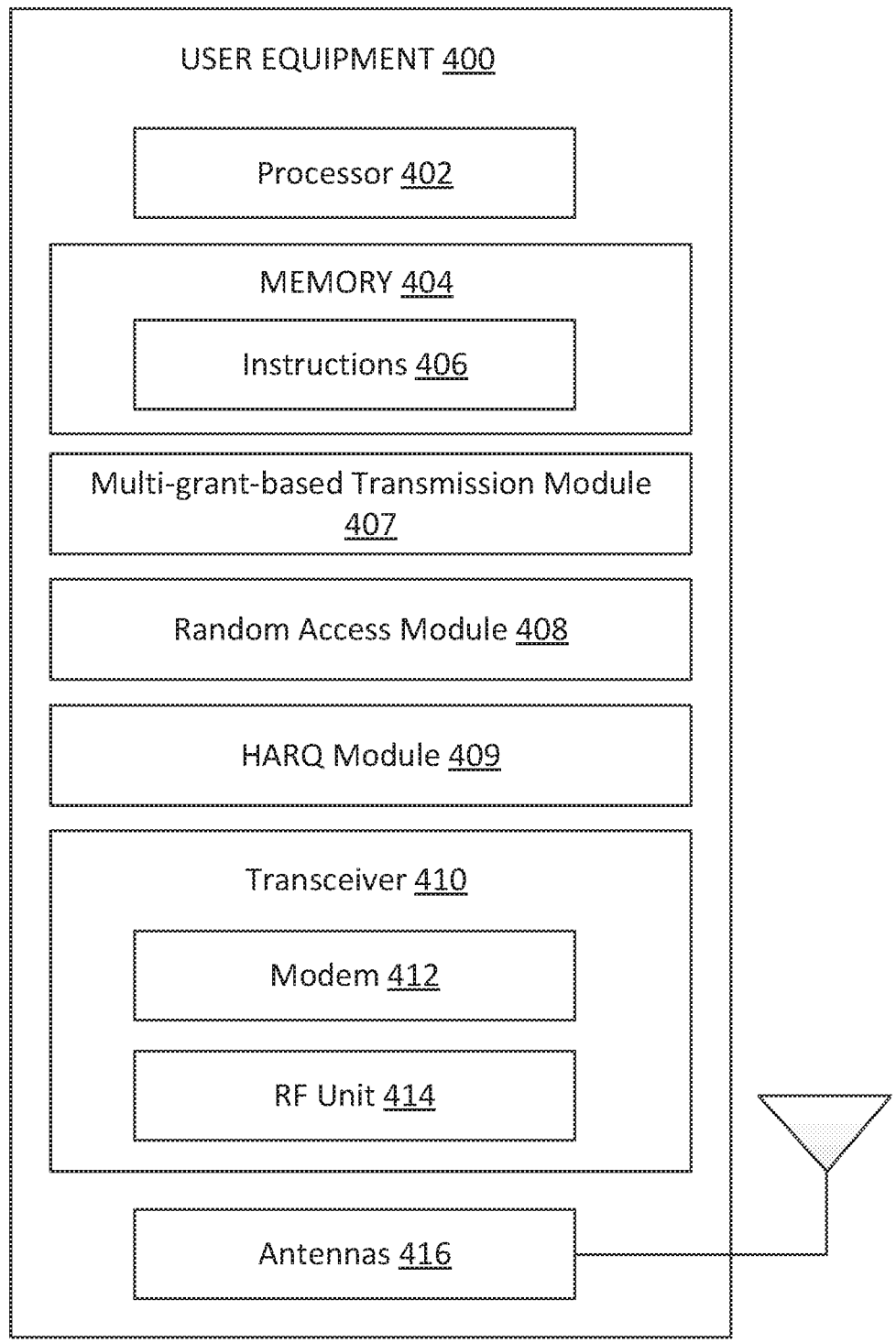
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 discussed above in FIG. 1. As shown, the UE 400 may include a processor 402, a memory 404, a multi-grant-based transmission module 407, a random access module 408, a HARQ module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 6-16. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the multi-grant-based transmission module 407, the random access module 408, and the HARQ module 409 may be implemented via hardware, software, or combinations thereof. For example, each of the multi-grant-based transmission module 407, the random access module 408, and the HARQ module 409 may be implemented as a processor, circuit, and/or instructions 406 stored in the memory 404 and executed by the processor 402. In some examples, the multi-grant-based transmission module 407, the random access module 408, and the HARQ module 409 can be integrated within the modem subsystem 412. For example, the multi-grant-based transmission module 407, the random access module 408, and the HARQ module 409 can be implemented by a combination of software components (e.g., executed by a DSP or a general processor) and hardware components (e.g., logic gates and circuitry) within the modem subsystem 412. In some examples, a UE may include one or more of the multi-grant-based transmission module 407, the random access module 408, or the HARQ module 409. In other examples, a UE may include the multi-grant-based transmission module 407, the random access module 408, and the HARQ module 409.

The multi-grant-based transmission module 407, the random access module 408, and the HARQ module 409 may be used for various aspects of the present disclosure, for example, aspects of FIGS. 6-16. The multi-grant-based transmission module 407 is configured to receive multiple grants or multiple transmission occasions from a BS (e.g., the BS 105, 204, or 304) for a random access message (e.g., MSG3) transmission or HARQ data transmissions for multiple HARQ processes, receive repetition rules for random access message transmission and/or HARQ data transmissions from the BS, receive association rules for associating the HARQ processes with transmission occasions, performs LBT (e.g., the LBTs 230 and/or 350) based on the received multiple transmission occasions, coordinate with the random access module 408 to transmit a random access message and/or repetitions of random access message based on the granted transmission occasions and/or repetition rules, and/or coordinate with the HARQ module 409 to transmit HARQ data blocks for the HARQ processes and/or repetition of HARQ data blocks based on the granted transmission occasions, repetition rules, and/or association rules.

The random access module 408 is configured to transmit MSG1, monitor for MSG2 from the BS, coordinate with the multi-grant-based transmission module 407 to transmit a MSG3, puncture MSG3 based on the LBT, and/or repeat the transmission of the MSG3 based on the repetition rules, and/or monitor for a MSG4.

The HARQ module 409 is configured to manage and operate multiple parallel HARQ processes (e.g., the HARQ processes 312), coordinate with the multi-grant-based transmission module 407 to transmit HARQ data blocks of the HARQ processes, puncture a HARQ block based on the LBT, and/or repeat the transmission of the HARQ data blocks, receive ACKs and/or NACKs from the BS, and/or update the HARQ processes based on the received ACKs and/or NACKs. Mechanisms for using multiple transmission occasions to transmit random access message transmissions and/or HARQ transmissions are described in greater detail herein below.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the multi-grant-based transmission module 407 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., a random access message or a HARQ data block) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., a multi-grant scheduling grant) to the multi-grant-based transmission module 407 for processing. The antennas 416 may include multiple antennas of similar or different designs in order to sustain multiple transmission links. The RF unit 414 may configure the antennas 416.

In an example, the transceiver 410 is configured to receive a scheduling grant (e.g., from a BS 105, 204, and/or 304) indicating multiple transmission occasions for random access or HARQ communications and subsequently transmit a random access message or a HARQ data block in one or more of the multiple transmission occasions according to the scheduling grant, for example, by coordinating with the multi-grant-based transmission module 407, the random access module 408, and/or the HARQ module 409.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
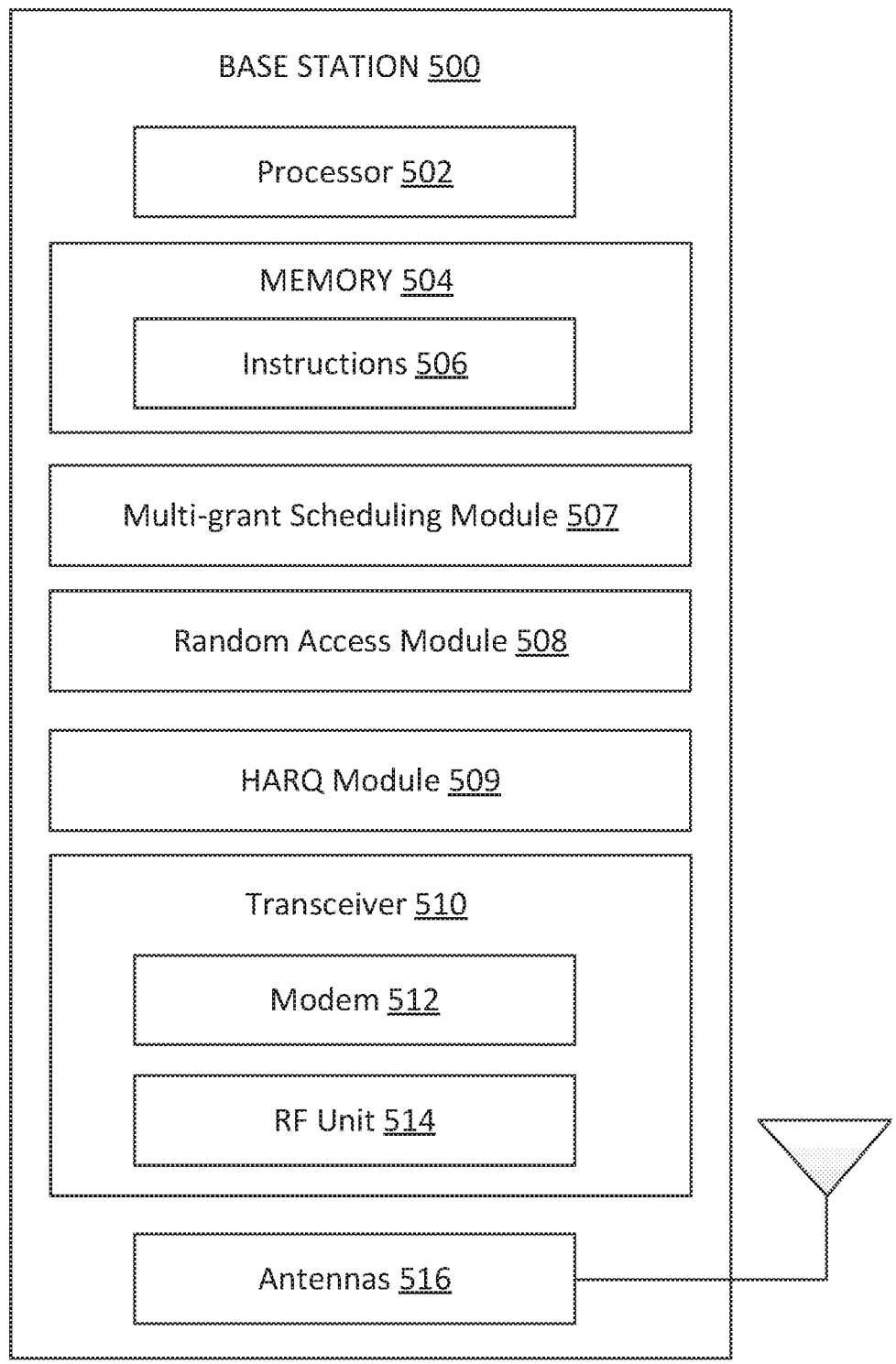
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 as discussed above in FIG. 1. As shown, the BS 500 may include a processor 502, a memory 504, a multi-grant scheduling module 507, a random access module 508, a HARQ module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-16. Instructions 506 may also be referred to as code, which may be interpreted broadly to include any type of computer-readable statement(s) as discussed above with respect to FIG. 4.

Each of the multi-grant scheduling module 507, the random access module 508, and the HARQ module 509 may be implemented via hardware, software, or combinations thereof. For example, each of the multi-grant scheduling module 507, the random access module 508, and the HARQ module 509 may be implemented as a processor, circuit, and/or instructions 506 stored in the memory 504 and executed by the processor 502. In some examples, the multi-grant scheduling module 507, the random access module 508, and the HARQ module 509 can be integrated within the modem subsystem 512. For example, the multi-grant scheduling module 507, the random access module 508, and the HARQ module 509 can be implemented by a combination of software components (e.g., executed by a DSP or a general processor) and hardware components (e.g., logic gates and circuitry) within the modem subsystem 512. In some examples, a UE may include one or more of the multi-grant scheduling module 507, the random access module 508, or the HARQ module 509. In other examples, a UE may include the multiple grant scheduling module 507, the random access module 508, and the HARQ module 509.

The multi-grant scheduling module 507, the random access module 508, and the HARQ module 509 may be used for various aspects of the present disclosure, for example, aspects of FIGS. 6-16. The multi-grant scheduling module 507 is configured to transmit a multiple grants or multiple transmission occasions to a UE (e.g., the UE 115, 202, 302, or 400) for a random access message (e.g., MSG3) transmission or HARQ data transmissions for multiple HARQ processes, configure the UE with repetition rules for random access message transmissions and/or HARQ data transmissions, configure the UE with association rules for associating the HARQ processes with transmission occasions, coordinate with the random access module 508 to monitor and receive a random access message and/or repetitions of random access message based on the granted transmission occasions and/or repetition rules, coordinate with the HARQ module 509 to receive HARQ data blocks for the HARQ processes and/or repetition of HARQ data blocks based on the granted transmission occasions, repetition rules, and/or association rules, and/or reclaim unused transmission occasions for other UL and/or DL communications.

The random access module 508 is configured to monitor for a MSG1 from a UE (e.g., the UE 115, 202, 302, or 400), transmit a MSG2 to the UE in response to a received MSG1, coordinate with the multi-grant scheduling module 507 to receive a MSG3 and/or repetitions of the MSG3 based on the repetition rules, and/or transmit a MSG4 in response to a received MSG3.

The HARQ module 509 is configured to manage and operate multiple parallel HARQ processes (e.g., the HARQ processes 312), coordinate with the multi-grant scheduling module 507 to receive HARQ data blocks of the HARQ processes, puncture a HARQ block based on the LBT, and/or repeat the transmission of the HARQ data blocks and/or repetitions based on the granted transmission occasions, repetition rules, and/or associations, transmit ACKs and/or NACKs to feedback the UE with HARQ data decoding statuses, perform soft-combining for decoding received HARQ data, and/or update the HARQ processes based on the HARQ data decoding statuses. Mechanisms for using multiple transmission occasions to transmit random access message transmissions and/or HARQ transmissions are described in greater detail herein below.

As shown, the transceiver 510 may include the modem subsystem 512 and the RF unit 514. The transceiver 510 can be configured to communicate bi-directionally with other devices, such as the UEs 115, 302, 302, and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., a multi-grant scheduling grant) from the modem subsystem 512 (on outbound transmissions) or of transmissions originating from another source such as a UE 115, 202, 302, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, 202, 302, or 400 according to embodiments of the present disclosure. The antennas 516 may further receive data messages transmitted from other devices and provide the received data messages for processing and/or demodulation at the transceiver 510. The transceiver 510 may provide the demodulated and decoded data (e.g., a random access message or a HARQ data block) to the random access module 508 or the HARQ module 509 for processing. The antennas 516 may include multiple antennas of similar or different designs in order to sustain multiple transmission links.

In an example, the transceiver 510 is configured to transmit a scheduling grant (e.g., to a UE 115, 202, 302, and/or 400) indicating multiple transmission occasions for random access or HARQ communications and subsequently receive a random access message or a HARQ data block in one or more of the multiple transmission occasions according to the scheduling grant, for example, by coordinating with the multi-grant scheduling module 507, the random access module 508, and/or the HARQ module 509.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

FIGS. 6-10 illustrate various mechanisms for scheduling multiple grants for random access message transmissions. In FIGS. 6-10, the schemes 600, 700, 800, 900, and 1000 may be employed by a BS such as the BSs 105, 204, 304, and/or 500 and a UE such as the UEs 115, 202, 302, and/or 400 in a network such as the network 100 operating over a shared frequency band or an unlicensed frequency band. In particular, the BS may schedule the UE with multiple transmission occasions for random access message transmissions during a random access procedure (e.g., the method 210). Additionally, the x-axes in FIGS. 6-10 represent time in some arbitrary units. FIGS. 6-10 are described using a substantially similar slot structure as FIG. 2, and may use the same reference numerals as in FIG. 2 for simplicity sake.

Figure 6:
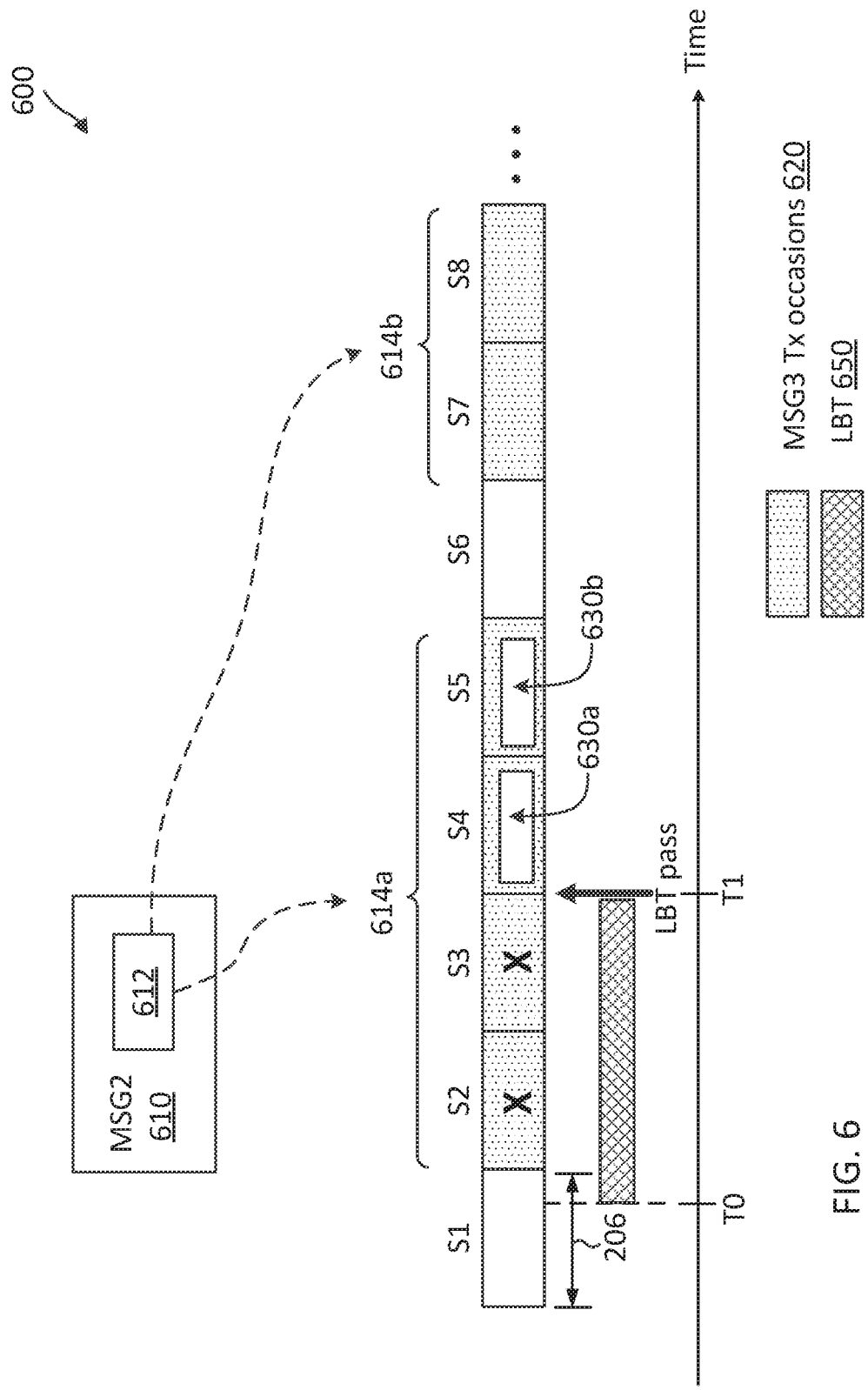
FIG. 6 illustrates a multi-grant scheduling scheme for random access according to some embodiments of the present disclosure.

FIG. 6 illustrates a multi-grant scheduling scheme 600 for random access according to some embodiments of the present disclosure. In the scheme 600, a BS (e.g., the BSs 105, 204, 304, and/or 500) transmits a MSG2 610 similar to the MSG2 222. The MSG2 610 includes a scheduling grant 612 for a UE (e.g., the UEs 115, 202, 302, and/or 400) to transmit a MSG3 630 (e.g., the MSG3 232). The grant 612 indicates multiple MSG3 transmission (Tx) occasions 620. As an example, the scheme 600 may schedule the MSG3 transmission occasions 620 at a granularity of a slot 206. In other words, each MSG3 transmission occasion 620 may correspond to a slot 206. The MSG3 transmission occasions 620 can be distributed over a time period, for example, within a COT period of the BS. Some of the MSG3 transmission occasions 620 can be contiguous in time. Some of the MSG3 transmission occasions 620 can be spaced apart from each other. In some examples, at least a subset of the MSG transmission occasions 620 is in contiguous slots 206. For simplicity of discussion and illustration, FIG. 6 illustrates six MSG3 transmission occasions 620 in the slots S2, S3, S4, S5, S7, and S8 206, though it will be recognized that embodiments of the present disclosure may scale to a greater number of MSG3 transmission occasions 620 (e.g., about 7, 8, 9, or more slots 206) or a less number of MSG3 transmission occasions 620 (e.g., about 2, 3, 4, or 5 slots 206).

The UE performs an LBT 650 (e.g., the LBTs 230 and 350) beginning at a time T0 prior to the start of an earliest MSG3 transmission occasion 620 (e.g., at the slot S2 206) indicated by the grant 612. When the MSG3 transmission occasions 620 are within the BS's COT period, the LBT 650 can be a CAT2 LBT. As an example, the LBT 650 fails at the beginning of the slot S2 206 and at the beginning of the slot S3 206 (shown by the cross symbols), but passes at the beginning of the next slot S4 206. After passing the LBT 650, the UE transmits a MSG3 630 (shown as 630*a*) in the slot S4 206 and repeats the transmission of the MSG3 630 (shown as 630*b*) in a following slot S5 206. The MSG3 630 may be substantially similar to the MSG3 232 of FIG. 2. The MSG3 630*a* and 630*b* include the same data information. For example, the MSG3 630*a* and MSG3 630*b* include the same encoded version of the data information. In some examples, the MSG3 630*a* and the MSG3 630*b* include different encoded versions of the data information.

In some examples, the repetitions may be restricted to be within a single continuous transmission burst (shown as 614*a* and 614*b*) in contiguous MSG3 transmission occasions 620, but not across transmission bursts. As shown, there is a gap (e.g., the slot S6 206) between the MSG3 transmission occasion 620 in the slot S5 206 and the next MSG3 transmission occasion 620 in the slot S7 206. Thus, the UE stops the transmission of the MSG3 630 at the end of the slot S5 206. The UE may discard the remaining MSG3 transmission occasions 620 granted by the grant 612.

In some examples, the repetitions may be restricted to be within a set of MSG3 transmission occasions 620 which are associated with the same LBT parameters. For instance, the UE may be required to perform a CAT-2 LBT from the slot S2 206 to the slot S5 206, and a CAT-4 LBT from the slot S7 206 to the slot S8 206. For example, if the UE gains access to the channel on or before the slot S5 206, the UE may transmit the MSG3 630 and/or repeat the transmission of the MSG3 630 until the end of the slot S5 206. The UE stops transmission of the MSG3 630 at the end of the slot S5 206 because the next available MSG3 transmission occasion 620 is in slot S7 206, where the UE is required to perform a CAT4 LBT starting from the slot S7 206.

The restriction on the repetitions may reduce interference. For example, if the UE repeats the transmission of the MSG3 630 in the next MSG3 transmission occasion 620 (e.g., the slot S7 206) after the gap, the UE may be required (e.g., by the standard) to perform another LBT and contend for the channel. The contention can potentially cause in a collision. Thus, the restriction can reduce interference.

The restriction on the repetitions can additionally allow the BS to reclaim remaining resources (e.g., unused MSG3 transmission occasions 620 in the slots S7 and S8 206). For example, after the BS detected the MSG3 630 in the slots S4 and S5 630 within the burst 614*a*, the BS may assume that the UE is completed with the MSG3 630 transmission and may reclaim the slots S7 and S8 206 (e.g., in a next burst 614*b*) for other UL and/or DL communications. In some examples, the communications in the slots S7 and/or S8 206 can be with the same UE. In some examples, the communications in the slots S7 and/or S8 206 can be with different UEs. However, if the BS fails to detect a MSG3 630 in the slots S2 to S5 206, the BS may continue to monitor for MSG3 630 from the UE in the slots S7 and S8 206.

In general, the BS may grant the UE with M transmission occasions 620 for MSG3 transmission and may configure the UE with a repetition configuration (e.g., repetition rules), where M is a positive integer. In some examples, the repetition configuration may indicate N repetitions among the M transmission occasions 620, where N is a positive integer less than or equal to M. For example, when N is 1, the UE may transmit a single MSG3 630 in one MSG3 transmission occasion 620. When N is 2, the UE may transmit the MSG3 630 twice, each in one of the MSG3 transmission occasions 620. In some examples, the repetition configuration may restrict repetitions to be within a single transmission burst (e.g., the bursts 614*a* and 614*b*) or within a set of MSG3 transmission occasions 620 which are associated with the same LBT parameters. In some examples, the repetition configuration may configure the UE to transmit the MSG3 630 with a maximum of N repetitions after passing an LBT 650. In some examples, when the BS does not provide the UE with a repetition parameter N, the UE may assume a value of 1 for N (e.g., a single transmission of MSG3 630). In general, the repetition configuration can include any suitable combination of the N parameter, the single burst transmission restriction for the repetitions.

In some examples, the BS may configure the UE with a repetition configuration via an RRC configuration message. In some examples, the BS may configure the UE with a repetition configuration via a media access control (MAC) control element (CE) message. In some examples, the BS may configure the UE with a repetition configuration via a downlink control information (DCI) message. In some examples, the BS may indicate a repetition configuration along with the grant 612 in the MSG2 610. In some examples, the BS may indicate the MSG3 transmission occasions 620 in a single DCI or a single RAR. In some examples, the BS may indicate the MSG3 transmission occasions 620 in multiple DCI messages or multiple RARs. In general, the BS may indicate the MSG3 transmission occasions 620 and the repetition configuration via any suitable combination of RRC message, MAC CE message, DCI message, and/or RAR.

While FIG. 6 illustrates the scheduling of the MSG3 transmission occasions 620 at a granularity of a slot 206, the BS can schedule the MSG3 transmission occasions 620 at any suitable time granularity (e.g., at a mini-slot level or a combination of slot and mini-slot levels). In some examples, a slot 206 may include about 14 symbols and a mini-slot can include about 2 to 13 symbols.

Figure 7:
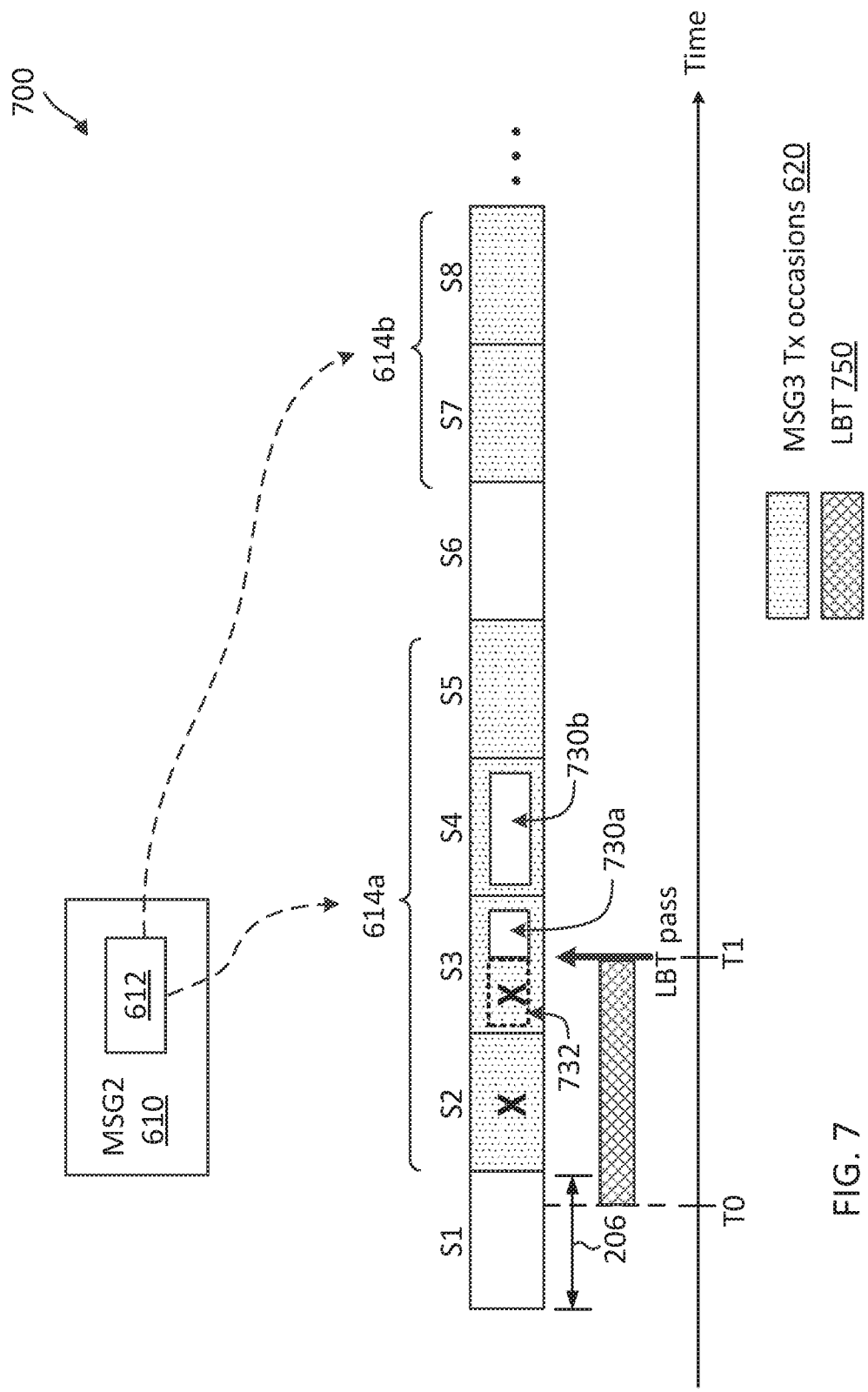
FIG. 7 illustrates a multi-grant scheduling scheme for random access according to some embodiments of the present disclosure.

FIG. 7 illustrates a multi-grant scheduling scheme 700 for random access according to some embodiments of the present disclosure. The scheme 700 is substantially similar to the scheme 600, and provides a scenario where an LBT pass is delayed into a time within a MSG3 transmission occasion 620 instead of at the start of a MSG3 transmission occasion 620 as in FIG. 6. The scheme 700 is described using the same MSG3 scheduling scenario as FIG. 6, and may use the same reference numerals as in FIG. 6 for simplicity sake. For example, the BS transmits a MSG2 610 including a grant 612 for the UE. The grant 612 indicates multiple MSG3 transmission occasions 620 in a group of contiguous slots S2, S3, S4, and S5 206 (e.g., the burst 614*a*), followed by another group of contiguous slots S7 and S8 206 (e.g., the burst 614*b*).

Similar to the scheme 600, the UE performs an LBT 750 (e.g., the LBTs 230, 350, and/or 650) beginning at a time T0 prior to the start of an earliest available MSG3 transmission occasion 620 (e.g., at the slot S2 206) indicated by the grant 612. The LBT 750 fails at the beginning of the slot S2 206 and at the beginning of the slot S3 206 (shown by the cross symbols), but passes at a later time T1 within the slot S3 206. After passing the LBT 750, the UE may transmit a MSG3 730 (e.g., the MSG3 232 and/or 630) in the remaining portion of the slot S3 206 (e.g., between time T1 and the end of slot S3 206) by applying puncturing and repeats the transmission of the MSG3 730 in a next MSG3 transmission occasion 620 in the slot S4 206. The first transmission of the MSG3 730 in the slot S3 206 is shown as 730*a*. The second transmission of the MSG3 730 in the slot S4 206 is shown as 730*b*. Each of the MSG3 730*a* and the MSG3 730*b* is transmitted in the form of a TB. The TB in the MSG3 730*a* includes a punctured portion 732 (shown by the dotted line box). For example, upon receiving the grant 612, the UE may prepare the TB for the MSG3 730 based on resources (e.g., of a slot 206) indicated by the grant 612. Upon detecting that the LBT 750 passes at a delayed time T1, the UE punctures a beginning portion of the TB in the MSG3 730*a*, where the punctured portion 732 may correspond to the beginning symbols of the slot S3 206 (from the start of the slot S3 206 to the time T1).

In some examples, when an initial transmission of a MSG3 730 is punctured, the UE may additionally transmit a repetition of the MSG3 730 in a next available MSG3 transmission occasion 620. The puncturing can degrade decoding gain. The repetition may increase the probability of a successful decoding of the MSG3 730 at the BS. The UE may repeat the transmission of the MSG3 730 using the same encoded version when the initial transmission is punctured. In some examples, when the BS configures the UE with one or more repetitions for MSG3 transmissions, for example, in a RRC configuration, the UE may not be required to perform an additional repetition due to puncturing. In other words, if the BS configures the UE with N equal to 2, the UE may transmit the MSG3 730 two times including the punctured transmission.

Figure 8:
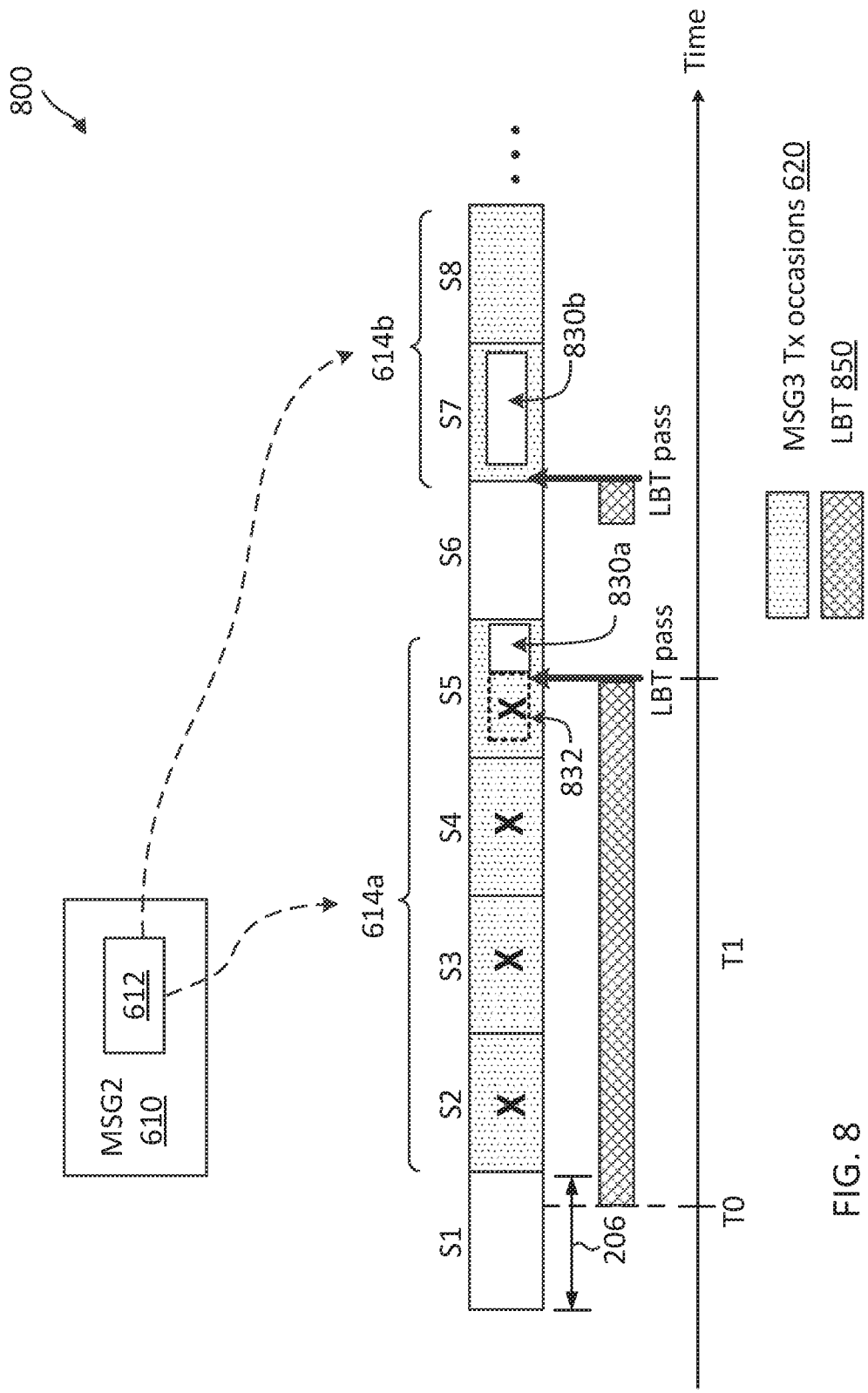
FIG. 8 illustrates a multi-grant scheduling scheme for random access according to some embodiments of the present disclosure.

FIG. 8 illustrates a multi-grant scheduling scheme 800 for random access according to some embodiments of the present disclosure. The scheme 800 is described using the same multi-grant scheduling scenario as in FIG. 6, and may use the same reference numerals as in FIG. 6 for simplicity sake. The scheme 800 provides a scenario where an LBT success is delayed into the last MSG3 transmission occasion 620 of a group of contiguous MSG3 transmission occasions 620 (e.g., the burst 614*a*). As shown, the UE performs an LBT 850 (e.g., the LBTs 230, 350, 650 and/or 750) beginning at a time T0 prior to the start of an earliest available MSG3 transmission occasion 620 (e.g., at the slot S2 206) indicated by the grant 612. The LBT 850 fails at the beginning of the slot S2 and continues to fail in subsequent contiguous MSG3 transmission occasions 620 in the slots S3, S4, and S5 206 (shown by the cross symbols), but passes at a later time T1 within the last MSG3 transmission occasion 620 in the slot S5 206.

The scheme 800 allows the UE to transmit a punctured MSG3 830 in the last MSG3 transmission occasion 620 of the group of contiguous MSG3 transmission occasions 620 and a single repetition of the MSG3 830 in a next available MSG3 transmission occasion 620 after a gap period (e.g., the slot S6 206 between the bursts 614*a* and 614*b*). As shown, the UE transmits a punctured MSG3 830 (shown as 830*a* with a punctured portion 832) in the last MSG3 transmission occasion 620 (e.g., in the slot S5 206) of the group. The dotted line box represents the punctured portion 832. The UE may perform another LBT 850 prior to the start of the next MSG3 transmission occasion 620 in the slot S7 206. When the LBT 850 passes for the slot S7 206, the UE transmits a single repetition of the MSG3 830 (shown as 830*b*) in the next available MSG3 transmission occasion 620. The MSG3 830 may be substantially similar to the MSG3 232, 630, and/or 730. The MSG3 830*a* and 830*b* may include the same encoded version of MSG3 data. However, if the LBT 850 fails at the start of the slot S7 206, the UE may not transmit another repetition of the MSG3 830 after the punctured MSG3 830*a*.

Figure 9:
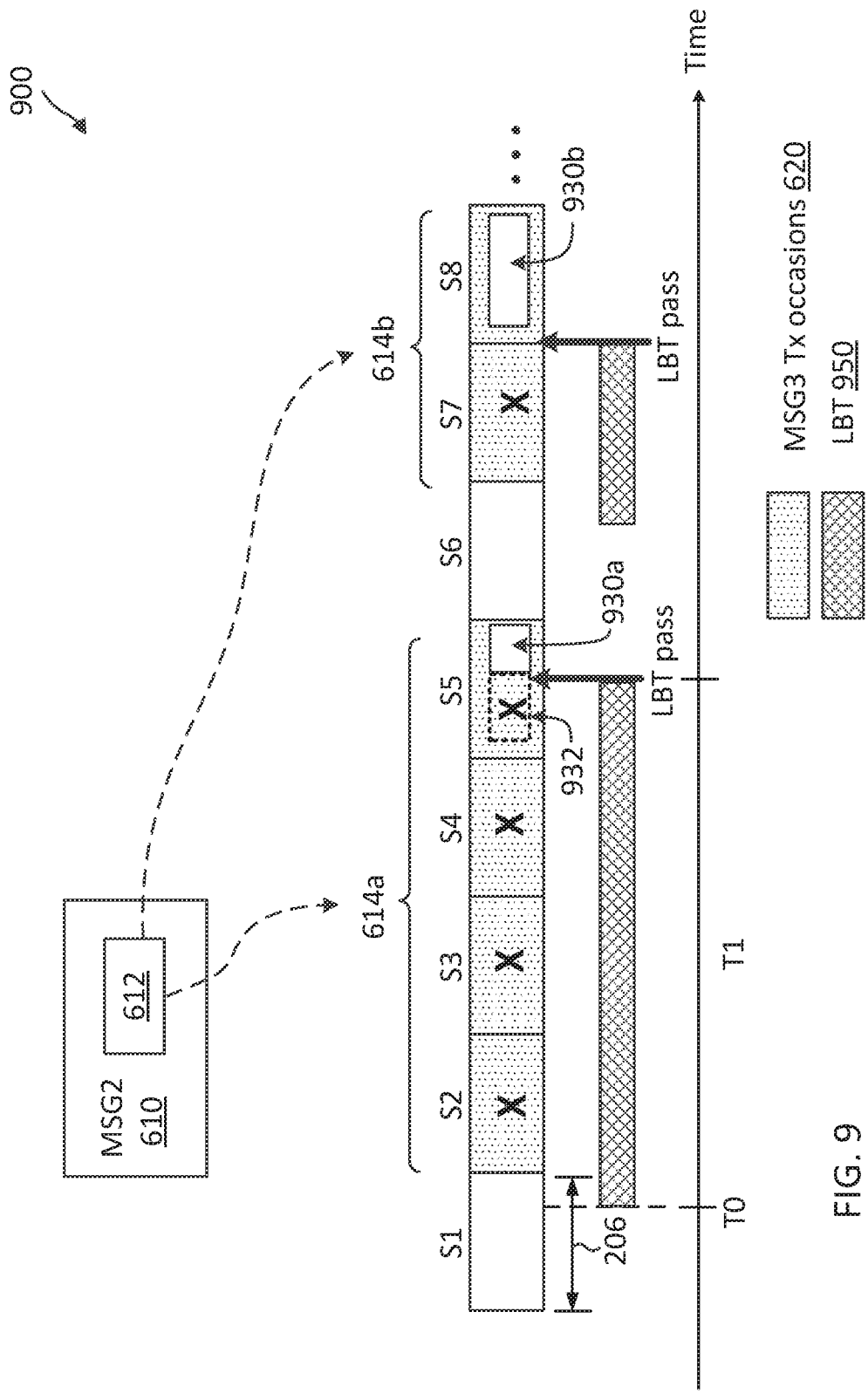
FIG. 9 illustrates a multi-grant scheduling scheme for random access according to some embodiments of the present disclosure.

FIG. 9 illustrates a multi-grant scheduling scheme 900 for random access according to some embodiments of the present disclosure. The scheme 900 is described using the same multi-grant scheduling scenario as in FIG. 6, and may use the same reference numerals as in FIG. 6 for simplicity sake. The scheme 900 provides another scenario where an LBT success is delayed into the last MSG3 transmission occasion of a group of contiguous MSG3 transmission occasions 620 (e.g., the burst 614*a*). As shown, the UE performs an LBT 950 (e.g., the LBTs 230, 350, 650, 750, and/or 850) beginning at a time T0 prior to the start of an earliest available MSG3 transmission occasion 620 (e.g., at the slot S2 206) indicated by the grant 612. Similar to the scheme 800, the LBT 950 passes at a time T1 within the last MSG3 transmission occasion 620 in the slot S5 206.

Similar to the scheme 800, the scheme 900 allows the UE to transmit a punctured MSG3 930 in the last MSG3 transmission occasion 620 of the group of contiguous MSG3 transmission occasions 620. However, the scheme 900 allows the UE to transmit a single repetition of the MSG3 930 in any remaining MSG3 transmission occasions 620 (e.g., after a gap period) instead of restricting the UE to use only an immediate next MSG3 transmission occasion 620 as in the scheme 800. As shown, the UE transmits a punctured MSG3 930 (shown as 930*a* with a punctured portion 932) in the last MSG3 transmission occasion 620 (e.g., in the slot S5 206). The punctured portion 932 is represented by the dotted line box. The UE performs another LBT 950 prior to the start of the next MSG3 transmission occasion 620 in the slot S7 206. When the LBT 950 fails for the slot S7 206 (shown by the cross symbol), the UE may retry an LBT 950 or continue with the LBT 950 for the next MSG3 transmission occasion 620 in the slot S8 206. When the LBT 950 passes for the slot S8 206, the UE transmits a repetition of the MSG3 930 (shown as 930*b*) in the slot S8 206. The MSG3 930 may be substantially similar to the MSG3 232, 630, 730, and/or 830. The MSG3*s* 930*a* and 930*b* may include the same encoded version of MSG3 data. The scheme 900 may provide better decoding performance than the scheme 800 due to the additional MSG3 transmission occasion 620 available for repetition in the slot S8 206.

Figure 10:
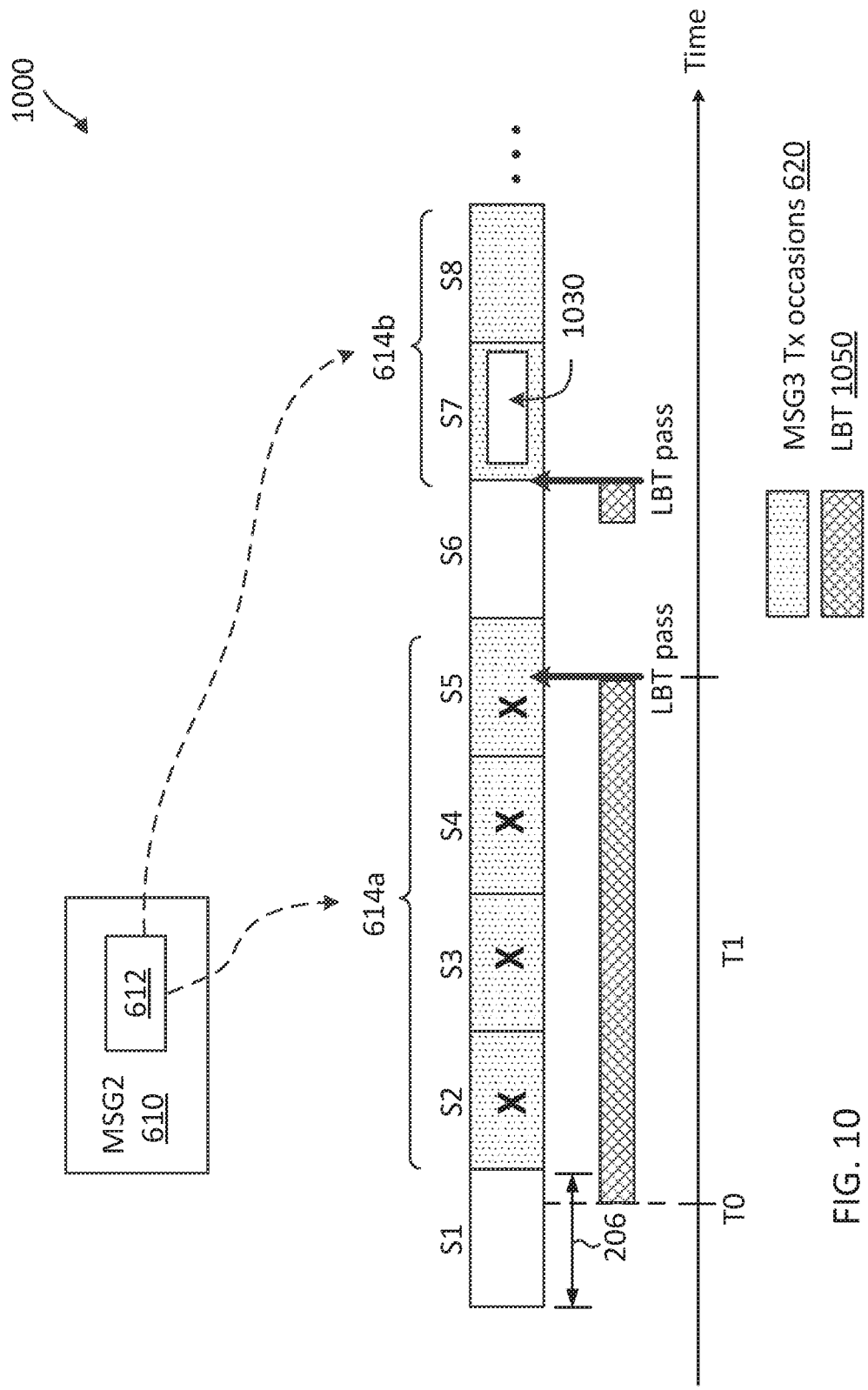
FIG. 10 illustrates a multi-grant scheduling scheme for random access according to some embodiments of the present disclosure.

FIG. 10 illustrates a multi-grant scheduling scheme 1000 for random access according to some embodiments of the present disclosure. The scheme 1000 is described using the same multi-grant scheduling scenario as in FIG. 6, and may use the same reference numerals as in FIG. 6 for simplicity sake. The scheme 1000 provides another scenario where an LBT success is delayed into the last MSG3 transmission occasion of a group of contiguous MSG3 transmission occasions 620 (e.g., the burst 614*a*). As shown, the UE performs an LBT 1050 (e.g., the LBTs 230, 350, 650, 750, 850, and/or 950) beginning at a time T0 prior to the start of an earliest available MSG3 transmission occasion 620 (e.g., at the slot S2 206) indicated by the grant 612. Similar to the schemes 800 and 900, the LBT 950 passes at a time T1 within the last MSG3 transmission occasion 620 in the slot S5 206.

In the scheme 1000, the UE discards the last MSG3 transmission occasion 620 (e.g., in the slot S5 206) in the group and transmit a MSG3 1030 in a next available MSG3 transmission occasion 620 (e.g., in the slot S7 206). In other words, the UE does not transmit a punctured MSG3 1030 in the remaining time of the slot S5 206 as in the schemes 800 and 900. The MSG3 1030 may be substantially similar to the MSG3 232, 630, 730, 830, and/or 930. The UE may perform another LBT 1050 prior to transmitting the MSG3 1030 after the gap (e.g., the slot S6 206). The restriction on the UE to discard the last MSG3 transmission occasion 620 in the group of contiguous MSG3 transmission occasions 620 when puncturing is required and begin the MSG3 transmission in a next MSG3 transmission occasion 620 can simplify decoding at the BS since the BS does not need to decode multiple UL transmissions across different bursts (e.g., the burst 614a and 614b).

In some embodiments, a BS (e.g., the BSs 105, 204, 304, and 500) may employ any suitable combination of the schemes 600, 700, 800, 900, and/or 1000 to schedule a UE (e.g., the UEs 115, 202, 302, and 400) with multiple grants for MSG3 transmissions and repetition rules. In some embodiments, the BS may further configure the UE to perform a repetition after a punctured transmission based on a threshold. For example, when the punctured portion is within a certain number of symbols, the UE may not be required to transmit an additional repetition. When the punctured portion exceeds a certain number of symbols, the UE is required to transmit an additional repetition. In some examples, the threshold for transmitting an additional repetition after a punctured transmission be about 1 symbol, 2 symbols, or 3 symbols. In some examples, the threshold for transmitting an additional repetition after a punctured transmission may vary depending on the duration of the MSG3 transmission occasion 620. In general, the BS may indicate the MSG3 transmission occasions 620 and/repetition rules (e.g., the repetition parameter N, the restriction on repetitions to a single burst 614, and/or the threshold for performing a repetition after a punctured transmission) via any suitable combination of RRC message, MAC CE message, DCI message, and/or RAR.

FIGS. 11-14 illustrate various mechanisms for scheduling multiple grants for HARQ communications. In FIGS. 11-14, the schemes 1100, 1200, 1300, and 1400 may be employed by a BS such as the BSs 105, 204, 304, and/or 500 and a UE such as the UEs 115, 202, 302, and/or 400 in a network such as the network 100 operating over a shared frequency band or an unlicensed frequency band. In particular, the BS may schedule the UE with multiple transmission occasions for UL data transmissions with HARQ. Additionally, the x-axes in FIGS. 11-14 represent time in some arbitrary units.

Figure 11:
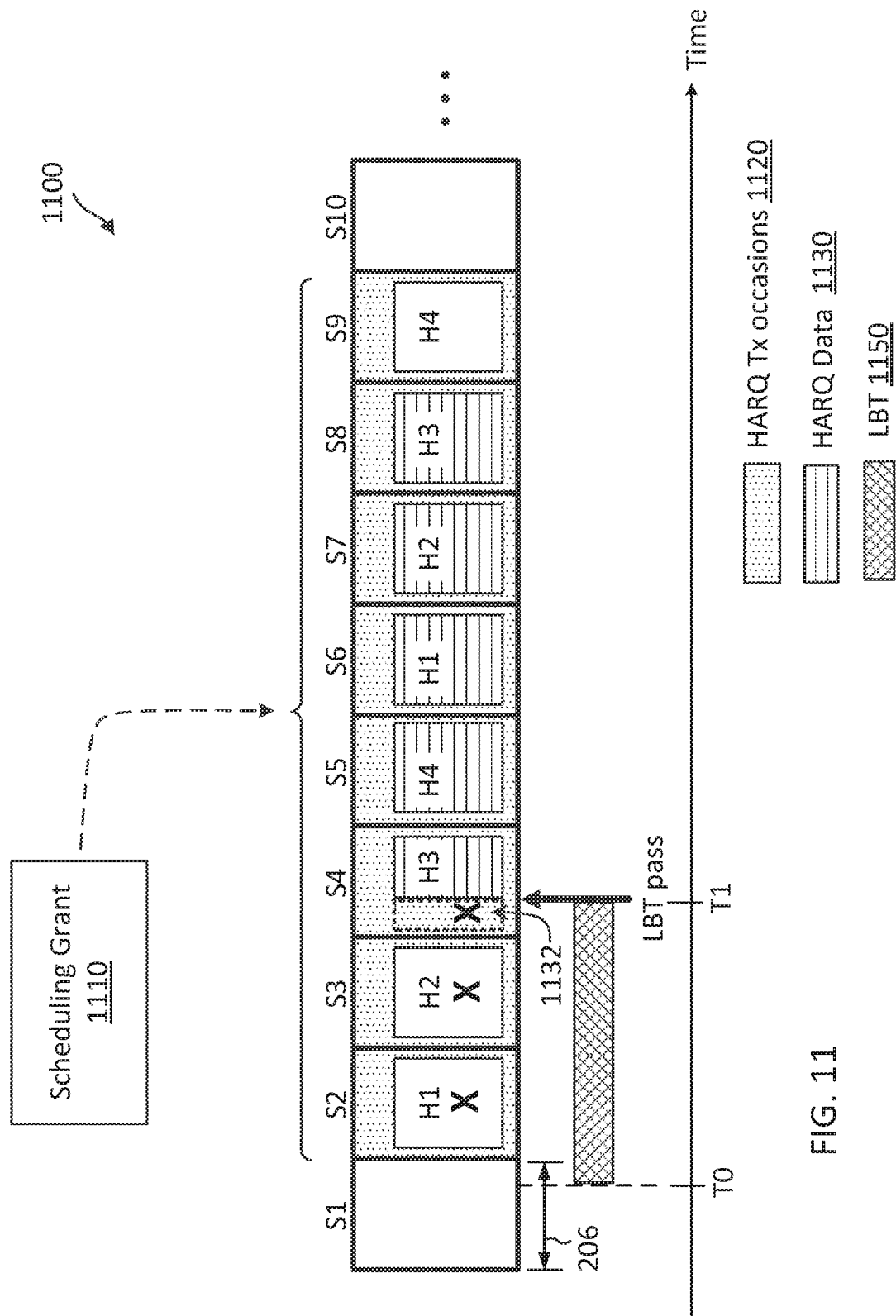
FIG. 11 illustrates a multi-grant scheduling scheme for HARQ communications according to some embodiments of the present disclosure.

FIG. 11 illustrates a multi-grant scheduling scheme 1100 for HARQ communications according to some embodiments of the present disclosure. The scheme 1100 is described using a substantially similar slot structure as FIG. 2, and may use the same reference numerals as in FIG. 2 for simplicity sake. In the scheme 1100, a BS (e.g., the BSs 105, 204, 304, and 500) transmits a scheduling grant 1110 including multiple contiguous HARQ transmission (Tx) occasions 1120 for a UE (e.g., the UEs 115, 202, 302, and/or 400) to transmit HARQ data. For example, the BS may communicate UL data with the UE using multiple parallel HARQ processes (e.g., the HARQ processes 312). In the scheme 1100, the BS may schedule multiple HARQ transmission occasions 1120 for each HARQ process and may associate each HARQ transmission occasion 1120 to one HARQ process. For simplicity of illustration and discussions, FIG. 11 illustrates the scheduling for four HARQ processes H1, H2, H3, and H4, though it will be recognized that embodiments of the present disclosure may scale to any suitable number of HARQ processes (e.g., about 2, 3, 5, 6, 7, 8 or more).

As shown, the HARQ transmission occasions 1120 are allocated in contiguous slots 206 from slots S2 206 to S9 206. The BS may associate the HARQ transmission occasion 1120 with the HARQ processes in a sequential round robin manner. As shown, the HARQ transmission occasion 1120 in the slot S2 206 is designated for the HARQ processes HE The HARQ transmission occasion 1120 in the slot S3 206 is designated for the HARQ processes H2. The HARQ transmission occasion 1120 in the slot S4 206 is designated for the HARQ processes H3. The HARQ transmission occasion 1120 in the slot S5 206 is designated for the HARQ processes H4. The subsequent HARQ transmission occasions 1120 in the slots S6, S7, S8, and S9 can be designated for the HARQ processes in the same order. In some examples, the BS may associate the HARQ transmission occasions 1120 with the HARQ processes in a different order.

In some examples, the scheduling grant 1110 may indicate the scheduled HARQ processes (e.g., H1, H2, H3, and H4). The scheduling grant 1110 may further indicate a number of HARQ transmission occasions 1120 scheduled for each HARQ process or a total number of HARQ transmission occasions 1120. The scheduling grant 1110 can indicate a mapping between the HARQ processes and the HARQ transmission occasions 1120. Referring to the example shown in FIG. 11, the BS may indicate a scheduling for eight slots 206 and HARQ process identifiers for the HARQ processes {H1, H2, H3, H4} and may indicate the HARQ process to transmission occasions mapping or association as {H1, H2, H3, H4, H1, H2, H3, H4}. In some other instances, the scheduling grant 1110 may indicate a starting HARQ process (e.g., H1) and an ending HARQ process (e.g., H4) and a mapping in a round robin fashion by default.

Upon receiving the grant 1110, the UE performs an LBT 1150 (e.g., the LBTs 230, 350, 650, 750, 850, 950, and/or 1050) beginning at a time T0 prior to the start of an earliest HARQ transmission occasions 1120 (e.g., at the slot S2 206) indicated by the grant 1110. When the HARQ transmission occasions 1120 are within the BS's COT period, the LBT 1150 can be a CAT2 LBT. As an example, the LBT 1150 fails at the beginning of the slots S2, S3, and S4 206 (shown by the cross symbols), but passes at a later time T1 within the slot S4 206. Thus, the UE may refrain from using the HARQ transmission occasion 1120 in the slot S2 206 for HARQ process H1 transmission and the HARQ transmission occasion 1120 in the slot S3 206 for HARQ process H2 transmission (shown by the cross symbols and the empty boxes).

The UE may use remaining time in the HARQ transmission occasion 1120 at the slot S4 206 for transmitting HARQ data 1130 (e.g., the HARQ data 330) of the HARQ process H3 based on the association. For example, the UE may prepare a TB carrying the HARQ data 1130 for the HARQ process H3 ahead of the scheduled time. Upon passing the LBT 1150 at time T1, the UE may puncture a beginning portion 1132 of the TB corresponding to the beginning portion of the slot S4 206 (e.g., from the start of slot S4 206 to time T1) and transmit the punctured TB in the remaining portion of the slot S4 206. The UE may transmit HARQ data 1130 (e.g., a non-punctured HARQ TB) of the HARQ process H4 in the slot S5 206 based on the association.

Since the UE missed the initial HARQ transmission occasions 1120 in the slots S2 and S3 206 for the HARQ processes H1 and H2, respectively, the UE may use the subsequent HARQ transmission occasion 1120 in the slot S6 206 for HARQ process H1 data transmission and the HARQ transmission occasion 1120 in the slot S7 206 for HARQ process H2 data transmission based on the association. Since the previous transmission of the HARQ data 1130 of the HARQ process H3 is punctured, the UE may use the subsequent HARQ transmission occasion 1120 in the slot S8 206 to retransmit the HARQ data 1130 of the HARQ process H3 to improve the decoding success probability at the BS. The HARQ data 1130 in each of the slots S6, S7, and S8 1120 is a non-punctured HARQ block in the illustrated example. The UE may not repeat the transmission for the HARQ process H4 in the slot S9 206 since an unpunctured version was previously transmitted in the slot S5 206.

In general, after passing an LBT 1150, the UE may transmit HARQ data 1130 for each scheduled HARQ process once in subsequent contiguous HARQ transmission occasions 1120 and discard remaining HARQ transmission occasions 1120. As described above, the HARQ data 1130 of the HARQ process H4 is not transmitted in the slot S9 206 because an unpunctured version was previously transmitted in the slot S5 206, while other HARQ processes H1-H3 that were not transmitted or a punctured version was transmitted are transmitted in corresponding slots S5-S8 206. Thus, the BS may detect when the UE started the HARQ data 1130 transmissions and when the UE may complete the HARQ data 1130 transmissions. The BS may reclaim unused resources (e.g., the slot S9 206) for scheduling other UL and/or DL communications (e.g., with another UE and/or the same UE). In some examples, the UE may additionally repeat the transmission of an earlier punctured transmission (e.g., the HARQ data 1130 of the HARQ process H3 in the slots S4 206). In some examples, the UE may additionally determine whether to repeat an earlier punctured transmission by comparing a duration of the punctured portion to a threshold. For example, when the punctured duration is short (e.g., about 1, 2, or 3 symbols), the UE may not repeat the transmission. Conversely, when the punctured duration is long, the UE may repeat the transmission. In some examples, the UE may not perform a punctured transmission by comparing a duration of the punctured portion to a threshold. For example, when the punctured duration is short (e.g., about 1, 2, or 3 symbols), the UE may perform a punctured transmission. Conversely, when the punctured duration is long, the UE may discard the HARQ transmission occasion and not perform a punctured transmission of the HARQ process in the given HARQ transmission occasion. In some examples, when the UE does not perform the transmission of an earlier scheduled HARQ process, the UE may apply the same HARQ parameter configuration for the transmission of the same HARQ process in the subsequent occasion. For example, the UE may use the same new data indicator (NDI) and/or redundancy version (RV) for transmitting the HARQ data 1130 of the HARQ process H2 in the slot S3 206 and slot S7 206.

As can be observed, the scheme 1100 provides multiple transmission occasions for HARQ data transmissions, and thus may increase HARQ data transmission success rate. The restriction on having a single HARQ data 1130 transmission for each scheduled HARQ process and/or repeating a transmission only for an earlier punctured transmission can avoid wasting resources, allowing the BS to reclaim remaining resources, and increasing the decoding success rate at the BS. Additionally, the associations between the HARQ processes and the HARQ transmission occasions 1120 can simplify decoding at the BS. For example, the BS may not be required to perform blind decoding as the association is known for the configuration.

Figure 12:
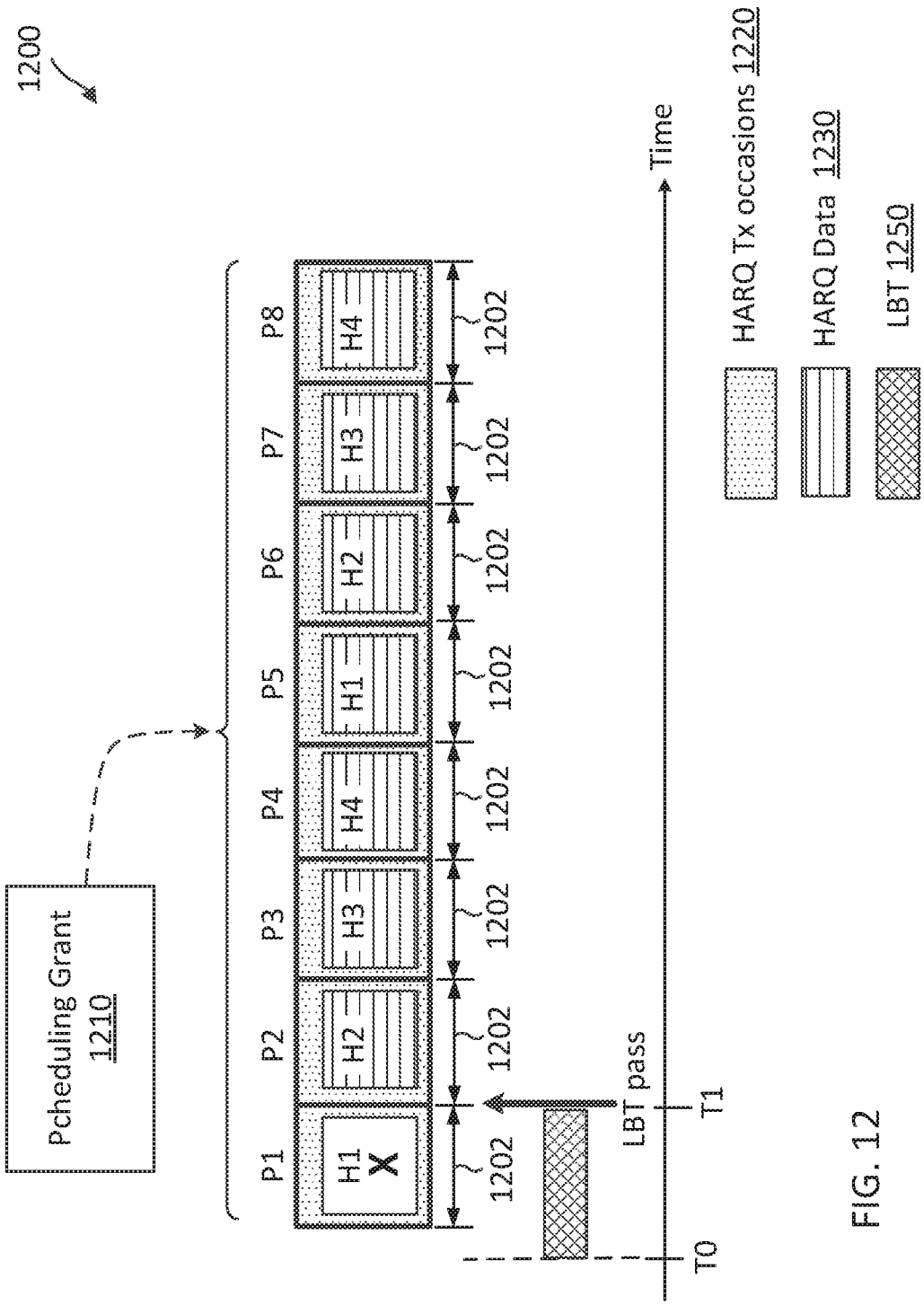
FIG. 12 illustrates a multi-grant scheduling scheme for HARQ communications according to some embodiments of the present disclosure.

FIG. 12 illustrates a multi-grant scheduling scheme 1200 for HARQ communications according to some embodiments of the present disclosure. The scheme 1200 is substantially similar to the scheme 1100, but may allow a UE (e.g., the UEs 115, 202, 302, and/or 400) to transmit HARQ data in all transmission occasions once the UE passes an LBT. As shown, a BS (e.g., the BSs 105, 204, 304, and 500) transmits a scheduling grant 1210 including multiple contiguous HARQ transmission occasions 1220 (shown as P1, P2, P3, P4, P5, P6, P7, and P8) for the UE to transmit HARQ data. For example, the BS may communicate UL data with the UE using multiple parallel HARQ processes (e.g., the HARQ processes 312). Similar to the scheme 1100, in the scheme 1200, the BS may schedule multiple HARQ transmission occasions 1220 for each HARQ process and may associate each HARQ transmission occasion 1220 to one HARQ process. In the scheme 1200, each HARQ transmission occasion 1220 may have the same duration 1202. The duration 1202 can be any suitable duration. In some examples, the duration 1202 may be a slot duration (e.g., the slot 206). In some examples, the duration 1202 may be a mini-slot duration. For simplicity of illustration and discussions, FIG. 12 illustrates the scheduling for four HARQ processes H1, H2, H3, and H4, though it will be recognized that embodiments of the present disclosure may scale to any suitable number of HARQ processes (e.g., about 2, 3, 5, 6, 7, 8 or more).

The scheduling grant 1210 may indicate the scheduled HARQ processes H1, H2, H3, and H4 and an association between each HARQ transmission occasion 1220 and a scheduled HARQ processes. For example, the HARQ transmission occasions P1 and P5 1220 are designated for HARQ process 1, the HARQ transmission occasions P2 and P6 1220 are designated for HARQ process 2, the HARQ transmission occasions P3 and P7 1220 are designated for HARQ process 3, and the HARQ transmission occasions P4 and P8 1220 are designated for HARQ process 4.

The UE performs an LBT 1250 (e.g., the LBTs 230, 350, 650, 750, 850, 950, 1050, and/or 1150) beginning at a time T0 prior to the start of an earliest available HARQ transmission occasion P1 1220 indicated by the grant 1210. The LBT 1250 fails at the beginning of the HARQ transmission occasion P1 1220 (shown by the cross symbols), but passes at the beginning of the HARQ transmission occasion P2 1220 (e.g., at time T1).

After passing the LBT 1250, the UE may transmit HARQ data 1230 (e.g., the HARQ data 330 and 1130) with repetitions until all HARQ transmission occasions 1220 are used. For example, the UE transmits HARQ data 1230 of the HARQ process H2 in the HARQ transmission occasion P2 1220 based on the association. The UE transmits HARQ data 1230 of the HARQ process H3 in the HARQ transmission occasion P3 1220 based on the association. The UE transmits HARQ data 1230 of the HARQ process H4 in the HARQ transmission occasion P4 1220 based on the association. The UE transmits HARQ data 1230 of the HARQ process H1 in the HARQ transmission occasion P5 1220 based on the association.

Subsequently, the UE repeats the transmission of the HARQ data 1230 of the HARQ process H2 in the HARQ transmission occasion P6 1220 based on the association. The UE repeats the transmission of the HARQ data 1230 of the HARQ process H3 in the HARQ transmission occasion P7 1220 based on the association. The UE repeats the transmission of the HARQ data 1230 of the HARQ process H3 in the HARQ transmission occasion P7 1220 based on the association. The UE repeats the transmission of the HARQ data 1230 of the HARQ process H4 in the HARQ transmission occasion P8 1220 based on the association. The BS may perform soft-combining when decoding the HARQ data 1230 for an HARQ process. For example, the BS may perform soft-combining on the HARQ data 1230 of the HARQ process H2 received in the HARQ transmission occasions P2 and P6 1220. The soft-combining can improve the decoding gain, and thus may avoid having to schedule a retransmission at a later time.

As can be observed, the scheme 1200 schedules the same number of repetitions for each HARQ process and the same duration for each HARQ transmission occasion 1220. In some examples, the BS can indicate to the UE whether the UE may perform transmission on all of the granted HARQ transmission occasions 1220.

Figure 13:
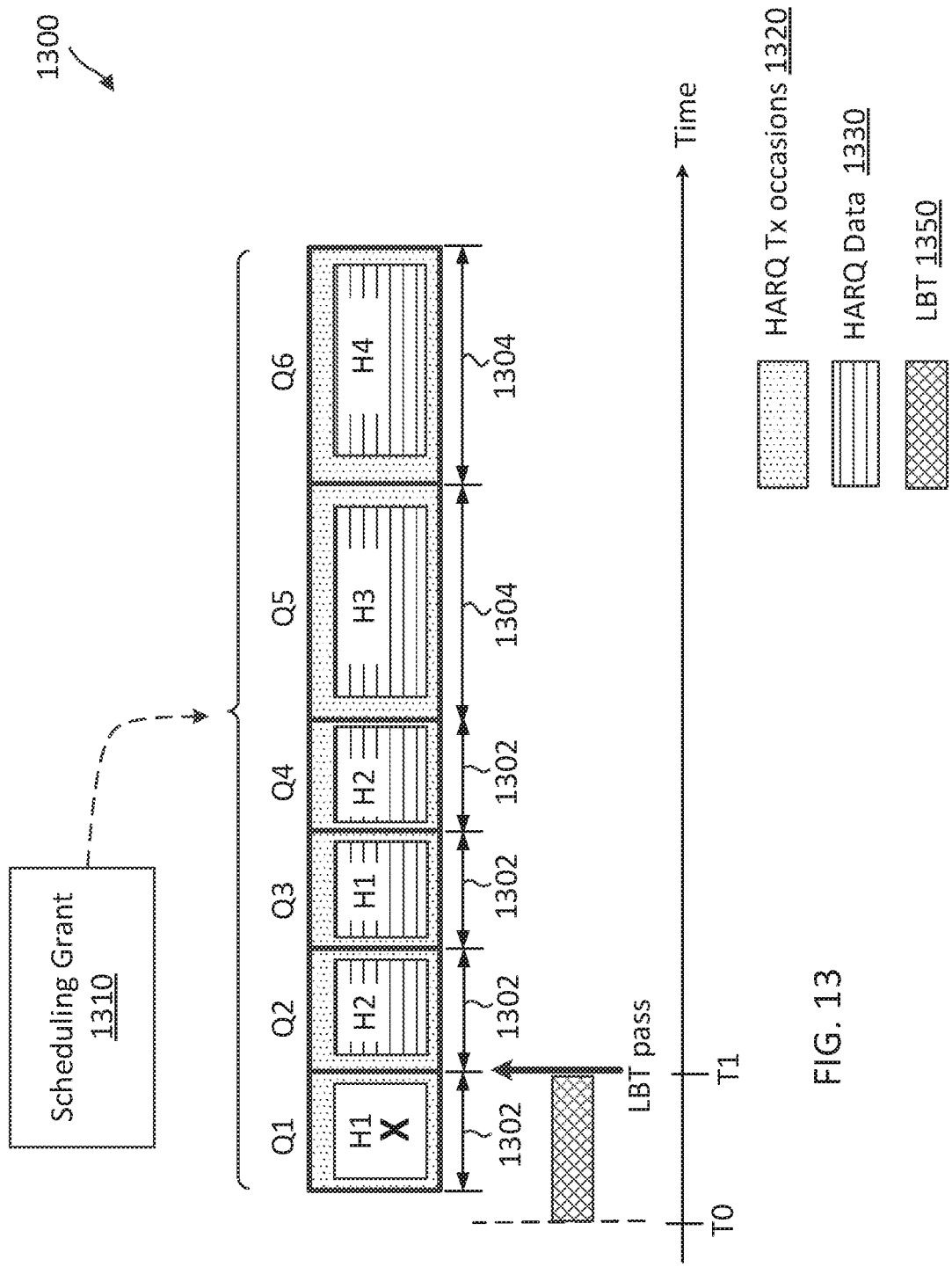
FIG. 13 illustrates a multi-grant scheduling scheme for HARQ communications according to some embodiments of the present disclosure.

FIG. 13 illustrates a multi-grant scheduling scheme 1300 for HARQ communications according to some embodiments of the present disclosure. The scheme 1300 is substantially similar to the scheme 1200, where a UE (e.g., the UEs 115, 202, 302, and/or 400) is allowed to transmit HARQ data in all transmission occasions once the UE passes an LBT and a particular association may be used for associating HARQ processes to transmission occasions. However, the scheme 1300 may schedule initial HARQ transmission occasions with a shorter duration than later HARQ transmission occasions. Additionally, the scheme 1300 may schedule different HARQ processes with different number of transmission occasions.

As shown, a BS (e.g., the BSs 105, 204, 304, and 500) transmits a scheduling grant 1310 including multiple contiguous HARQ transmission occasions 1320 (shown as Q1, Q2, Q3, Q4, Q5, and Q6) for the UE to transmit HARQ data. The earlier HARQ transmission occasions 1320 (e.g., Q1, S2, S3, and Q4) have a duration 1302. The later HARQ transmission occasions 1320 (e.g., Q5 and Q6) have a duration 1304. The duration 1302 can be shorter than the duration 1304. For example, the duration 1304 may be a slot duration (e.g., the slot 206) and the duration 1302 may be a mini-slot duration. In an example, the duration 1302 may be about half of the duration of 1304.

The BS may communicate UL data with the UE using multiple parallel HARQ processes (e.g., the HARQ processes 312). For simplicity of illustration and discussions, FIG. 13 illustrates the scheduling for four HARQ processes H1, H2, H3, and H4, though it will be recognized that embodiments of the present disclosure may scale to any suitable number of HARQ processes (e.g., about 2, 3, 5, 6, 7, 8 or more). The scheduling grant 1310 may indicate the scheduled HARQ processes H1, H2, H3, and H4 and an association between each HARQ transmission occasion 1320 and one of the scheduled HARQ processes. For example, the HARQ transmission occasions Q1 and Q3 1320 are designated for HARQ process 1, the HARQ transmission occasions Q2 and Q4 1320 are designated for HARQ process 2, the HARQ transmission occasion Q5 1320 is designated for HARQ process 3, and the HARQ transmission occasion Q6 is designated for HARQ process 4.

The UE performs an LBT 1350 (e.g., the LBTs 230, 350, 650, 750, 850, 950, 1050, 1150, and/or 1250) beginning at a time T0 prior to the start of an earliest available HARQ transmission occasion Q1 1320 indicated by the grant 1310. The LBT 1350 fails at the beginning of the HARQ transmission occasion Q1 1320 (shown by the cross symbols), but passes at the beginning of the HARQ transmission occasion Q2 1320 (e.g., at time T1).

After passing the LBT 1350, the UE may transmit HARQ data 1330 (e.g., the HARQ data 330, 1130, and/or 1230) with repetitions until all HARQ transmission occasions 1320 are used. For example, the UE transmits HARQ data 1330 of the HARQ process H2 in the HARQ transmission occasion Q2 1320 based on the association. The UE transmits HARQ data 1230 of the HARQ process H1 in the HARQ transmission occasion Q3 1320 based on the association. The UE repeats the transmission of the HARQ data 1330 of the HARQ process H2 in the HARQ transmission occasion Q4 1320 based on the association. The UE transmits HARQ data 1330 of the HARQ process H3 in the HARQ transmission occasion Q5 1320 based on the association. The UE transmits HARQ data 1330 of the HARQ process H4 in the HARQ transmission occasion Q6 1320 based on the association.

As can be observed, the HARQ processes H1 and H2 that are scheduled for the initial HARQ transmission occasions 1320 with the shorter duration 1302 are scheduled to accommodate repetitions, whereas the HARQ processes H3 and H4 that are scheduled for the later HARQ transmission occasions 1320 with the longer duration 1304 are scheduled with a single transmission (e.g., no repetition). The scheme 1300 schedules HARQ transmission occasions 1320 with a shorter duration 1302 at the beginning based on the assumption that the UE is likely to miss some HARQ transmission occasions 1320 at the beginning grants. In addition, since the UE is likely to miss some HARQ transmission occasions 1320 at the beginning, the scheme 1300 allows HARQ processes scheduled for the beginning HARQ transmission occasions 1320 to repeat. Since the UE is less likely to miss the later HARQ transmission occasions 1320, repetitions may not be required for HARQ processes scheduled for the later HARQ transmission occasions 1320. The scheduling of initial HARQ transmission occasions 1320 with a shorter duration and the provision for HARQ processes scheduled for the HARQ transmission occasions 1320 to repeat can increase HARQ decoding success rate and improve spectrum sharing and/or utilization efficiency.

Figure 14:
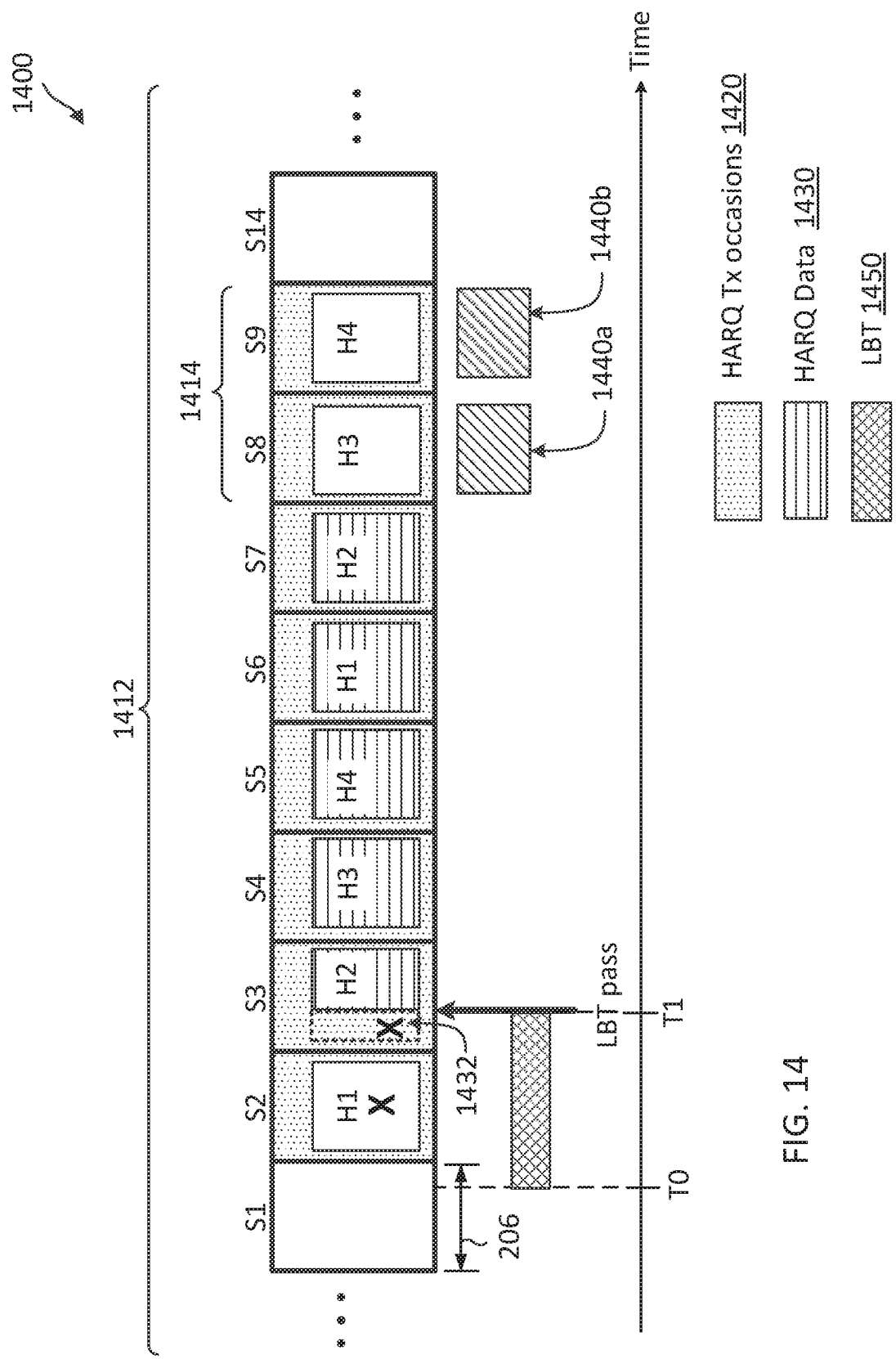
FIG. 14 illustrates a multi-grant scheduling scheme for HARQ communications according to some embodiments of the present disclosure.

FIG. 14 illustrates a multi-grant scheduling scheme 1400 for HARQ communications according to some embodiments of the present disclosure. The scheme 1400 is described using a substantially similar slot structure as FIG. 2 and the same scheduling scenario as FIG. 11, and may use the same reference numerals as in FIGS. 2 and 11 for simplicity sake. In the scheme 1400, a BS (e.g., the BSs 105, 204, 304, and 500) may perform a CAT4 LBT in a shared channel to acquire a COT period 1412. The BS may schedule multiple HARQ transmission occasions 1420 within the COT period 1412 for a UE (e.g., the UEs 115, 202, 302, and/or 400) to transmit HARQ data 1430. The BS may use any of the schemes 1100, 1200, and/or 1300 to schedule the HARQ transmission occasions 1420. For simplicity of illustration and discussions, FIG. 14 illustrates the scheduling for four HARQ processes H1, H2, H3, and H4 (e.g., the HARQ processes 312), though it will be recognized that embodiments of the present disclosure may scale to any suitable number of HARQ processes (e.g., about 2, 3, 5, 6, 7, 8 or more).

For example, the BS schedules HARQ transmission occasions 1420 in contiguous slots 206 from slot S2 206 to slot S9 206 for HARQ processes H1, H2, H3, and H4. The BS may associate the slots in a similar manner as in the scheme 1100. As shown, the slots S2 and S6 206 are designated for HARQ process H1, the slots S3 and S7 206 are designated for HARQ process H2, the slots S4 and S8 206 are designated for HARQ process H3, and the slots S5 and S9 206 are designated for HARQ process H4.

The UE performs an LBT 1450 (e.g., the LBTs 230, 350, 650, 750, 850, 950, 1050, 1150, 1250, and/or 1350) beginning at a time T0 prior to the start of an earliest HARQ transmission occasions 1420 (e.g., at the slot S2 206). Since the HARQ transmission occasions 1420 are within the COT period 1412, the LBT 1450 can be a CAT2 LBT. In other words, the UE may determine that the HARQ transmission occasions 1420 are within the BS's COT period 1412 and perform the CAT2 LBT 1450 for transmitting in the HARQ transmission occasions 1420 based on determining that the HARQ transmission occasions 1420 are within the BS's COT period 1412.

As an example, the LBT 1450 fails at the beginning of the slots S2 and S3 (shown by the cross symbols), but passes at a later time T1 within the slot S3 206. Thus, the UE may refrain from using the HARQ transmission occasion 1420 in the slot S2 206 for HARQ process H1 transmission and the HARQ transmission occasion 1420 in the slot S2 206 for HARQ process H2 transmission (shown by the cross symbols and the empty boxes).

After passing the LBT 1450 at time T1, the UE may transmit HARQ data 1430 (e.g., a punctured HARQ TB with a punctured portion 1432) for HARQ process H2 in remaining time of the slot S3 206. The UE may transmit HARQ data 1430 (e.g., a non-punctured HARQ TB) of the HARQ process H3 in the slot S4 206 based on the association. The UE may transmit HARQ data 1430 (e.g., a non-punctured HARQ TB) of the HARQ process H4 in the slot S5 206 based on the association. The UE may transmit HARQ data 1430 (e.g., a non-punctured HARQ TB) of the HARQ process H1 in the slot S6 206 based on the association. The UE may repeat the transmission of the HARQ data 1430 (e.g., a non-punctured HARQ TB) of the HARQ process H2 in the slot S6 206 based on the association. The UE may discard the remaining HARQ transmission occasions 1420 in the slots S7 and S8 1420.

The BS may detect the start of the UE's HARQ data 1430 transmission (e.g., in the slot S3 206). The BS may determine when the UE may complete all HARQ data 1430 transmission based on the UE's transmission start time, the number of HARQ processes in the schedule, the assumption that HARQ data for each HARQ process is transmitted once, and/or whether a repetition is allowed for a previous punctured transmission. Based on the determined UE's transmission completion time, the BS may reclaim unused resources within the COT period 1412. For example, based on the UE started the transmission within the slot S3 206 and the schedule scheduling for four HARQ processes, the BS can determine that the UE may complete the HARQ data 1430 transmission for the HARQ processes H1, H2, H3, and H4 in the slot S7 206. Accordingly, the BS may reclaim unused resources 1414 in the slots S8 and S9 105. The BS may schedule communications 1440a and 1440b in the slots S8 and S9 206, respectively. The communications 1440a and 1440b can include UL and/or DL communications. The BS may schedule the communications 1440a and 1440b with another UE and/or the same UE.

In an example, the BS may detect the start of the UE's transmission based on reference signal detection. For example, the BS may monitor for a demodulation reference signal (DMRS) from the UE in the HARQ transmission occasions 1420. Upon detecting a DMRS from the UE, the BS may determine that the UE started a HARQ data 1430 transmission. In some examples, the BS may incorrectly determine the start of a UE's HARQ data 1430 transmission. For example, the BS may determine that the UE started the HARQ data 1430 transmission in the slot S4 206 instead of slot S3 206. Thus, the BS may estimate that the UE may complete the HARQ data 1430 transmission in the slot S8 206 instead of in the slot S7 206. As such, the BS may leave the slot S8 206 unused. The BS may identify the UE start time detection error when the BS fails to detect a transmission (e.g., DMRS and/or HARQ data 1430) from the UE in the slot S8 206. The BS may still be able to reclaim the unused resource in the slot S9 206, but may be required to perform a CAT4 LBT prior to transmitting in the slot S9 206.

In an example, when the network uses carrier aggregation with a licensed band, the UE may transmit a message to the BS in the licensed band to indicate the start (e.g., time T1 or the slot S3 206) of the HARQ data 1430 transmission. Thus, the BS may correctly determine the completion time of the UE's HARQ data 1430 transmission based on the indication from the UE and may perform a CAT2 LBT prior to using the unused resource in the slot S8 206.

While the scheme 1400 is described in the context of multi-scheduling for HARQ transmissions, similar mechanisms can be applied to multi-scheduling for random access transmission. For example, a BS such as the BS 105, 204, 304, or 500 can perform a CAT4 LBT to acquire a COT period (e.g., the COT period 1412) and grant a UE such as the UE 115, 202, 302, or 400 with multiple transmission occasions (e.g., the MSG3 transmission occasions 620) within the acquired COT period for MSG3 transmissions.

Figure 15:
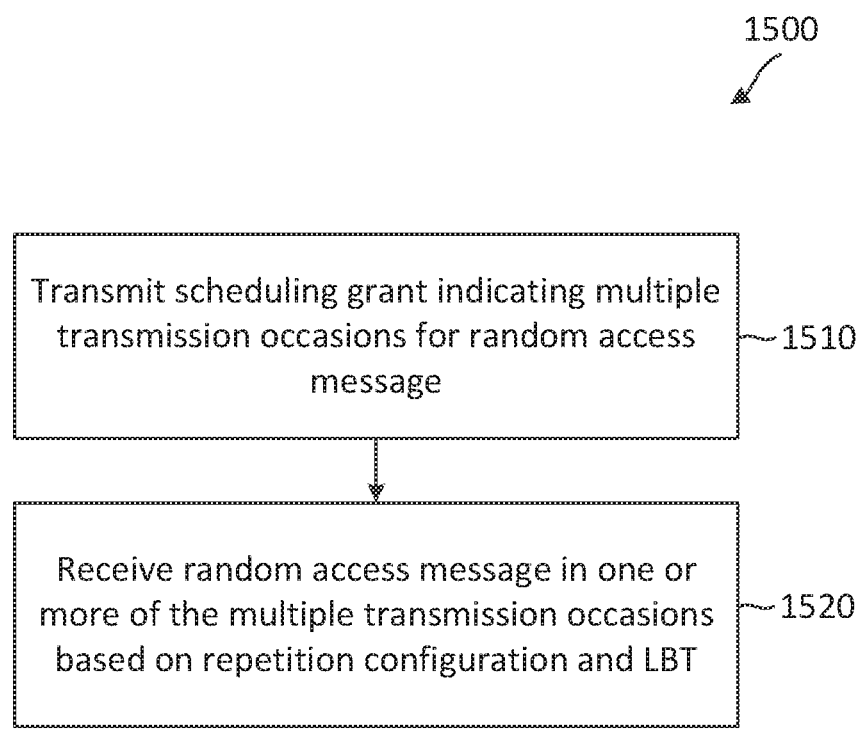
FIG. 15 is a flow diagram of a communication method according to some embodiments of the present disclosure.

FIG. 15 is a flow diagram of a communication method 1500 according to some embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the BS 105 or the BS 500, may utilize one or more components, such as the processor 502, the memory 504, the multi-grant scheduling module 507, the random access module 508, the HARQ module 509, the transceiver 510, the modem 512, and the one or more antennas 516, to execute the steps of method 1500. The method 1500 may employ similar mechanisms as in the schemes 600, 700, 800, 900, and 1000 described above with respect to FIGS. 6, 7, 8, 9, and 10, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes transmitting, by a BS (e.g., the BS 105 or the BS 500) to a UE (e.g., the BS 115 or the UE 400), a scheduling grant (e.g., the grant 612) indicating multiple transmission occasions (e.g., the MSG3 transmission occasions 620, 720, 820, 920, and/or 1020) for a random access message (e.g., the MSG3 232, 630, 730, 830, 930, and/or 1030).

A step 1520, the method 1500 includes receiving, by the BS from the UE, the random access message in one or more of the multiple transmission occasions based on a repetition configuration and an LBT (e.g., the LBTs 230, 350, 650, 750, 850, 950, and/or 1050).

Figure 16:
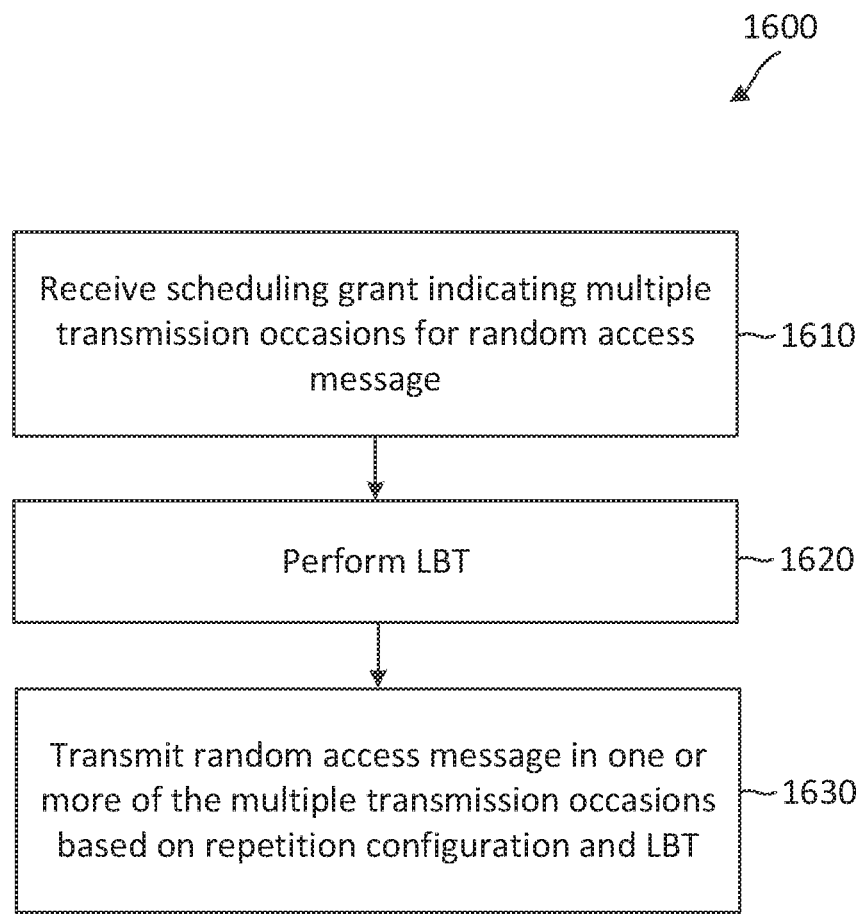
FIG. 16 is a flow diagram of a communication method according to some embodiments of the present disclosure.

FIG. 16 is a flow diagram of a communication method 1600 according to some embodiments of the present disclosure. Steps of the method 1600 can be executed by a computing device (e.g., a processor, processing circuit, and/or other suitable component) of a wireless communication device or other suitable means for performing the steps. For example, a wireless communication device, such as the UE 115, UE 202, UE 302, or UE 400, may utilize one or more components, such as the processor 402, the memory 404, the multi-grant-based transmission module 407, the random access module 408, the HARQ module 409, the transceiver 410, the modem 412, and the one or more antennas 416, to execute the steps of method 1600. The method 1600 may employ similar mechanisms as in the schemes 600, 700, 800, 900, and 1000 described above with respect to FIGS. 6, 7, 8, 9, and 10, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes receiving, by a UE (e.g., the UE 115 or the UE 400) from a BS (e.g., the BS 105 or the BS 500), a scheduling grant (e.g., the grant 612) indicating multiple transmission occasions (e.g., the MSG3 transmission occasions 620, 720, 820, 920, and/or 1020) for a random access message (e.g., the MSG3 232, 630, 730, 830, 930, and/or 1030).

At step 1620, the method 1600 includes performing, by the UE, an LBT (e.g., the LBTs 230, 350, 650, 750, 850, 950, and/or 1050).

A step 1630, the method 1600 includes transmitting, by the UE to the BS, the random access message in one or more of the multiple transmission occasions based on a repetition configuration and the LBT.

In an embodiment, a first wireless communication device may implement the method 1500 or the method 1600 described above with respect to FIG. 15 or 16, respectively. For example, the first wireless communication device communicates, with a second wireless communication device, a scheduling grant (e.g., the grant 612) indicating multiple transmission occasions (e.g., the MSG3 transmission occasions 620, 720, 820, 920, and/or 1020) for a random access message (e.g., the MSG3 232, 630, 730, 830, 930, and/or 1030). The first wireless communication device communicates, with the second wireless communication device, the random access message in one or more of the multiple transmission occasions based on a repetition configuration and an LBT (e.g., the LBTs 230, 350, 650, 750, 850, 950, and/or 1050). In an embodiment, the first wireless communication device corresponds to a BS (e.g., the BSs 105, 204, 304, and/or 500) and the second wireless communication device corresponds to a UE (e.g., the UEs 115, 202, 302, and/or 400). In such an embodiment, the first wireless communication device transmits the scheduling grant to the second wireless communication device and receives the random message from the second wireless communication device. In an embodiment, the first wireless communication device corresponds to a UE (e.g., the UEs 115, 202, 302, and/or 400) and the second wireless communication device corresponds to a BS (e.g., the BSs 105, 204, 304, and/or 500). In such an embodiment, the first wireless communication device receives the scheduling grant from the second wireless communication device and transmits the random access message to the second wireless communication device.

In an embodiment, the repetition configuration indicates a number of repetitions. The communicating the random access message includes communicating, by the first wireless communication device with the second wireless communication device, random access message is communicated in one or more transmissions of the random access message based on the number of repetitions, where each of the one or more transmissions of the random access message communicated in one of the multiple transmission occasions.

In an embodiment, the random access message includes communicating, by the first wireless communication device with the second wireless communication device, two or more transmissions of the random access message in contiguous transmission occasions of the multiple transmission occasions.

In an embodiment, the communicating the scheduling grant includes communicating, by the first wireless communication device with the second wireless communication device, a RAR (e.g., the MSG2s 222 and/or 610) including the scheduling grant and the repetition configuration.

In an embodiment, the first wireless communication device communicates, with the second wireless communication device, an RRC message including the repetition configuration. In an embodiment, the first wireless communication device communicates, with the second wireless communication device, a DCI message including the repetition configuration.

In an embodiment, the communicating the random access message includes communicating, by the first wireless communication device with the second wireless communication device, a data block (e.g., a TB) of the random access message in a first transmission occasion of the multiple transmission occasions, where the data block includes a punctured portion (e.g., the punctured portions 732, 832, and/or 932) based on the LBT. The first wireless communication device communicates, with the second wireless communication device a repetition of the data block in a second transmission occasion of the multiple transmission occasions, where the second transmission occasion is subsequent to the first transmission occasion. In an example, the first data block may correspond to the MSG3 630a and the second data block may correspond to the MSG3 630b. In an example, the first data block may correspond to the MSG3 730a and the second data block may correspond to the MSG3 730b. In an example, the first data block may correspond to the MSG3 830a and the second data block may correspond to the MSG3 830b. In an example, the first data block may correspond to the MSG3 930a and the second data block may correspond to the MSG3 930b. In an embodiment, the communicating the repetition of the data block is further based on a duration of the punctured portion exceeding a threshold (e.g., 1 symbol, 2 symbols, 3 symbols, or 4 symbols). In an embodiment, the second transmission occasion is spaced apart from the first transmission occasion. In an embodiment, the first transmission occasion corresponds to a last transmission occasion in a group of contiguous transmission occasions (e.g., the burst 614a or 614b) of the multiple transmission occasions. In an embodiment, the second transmission occasion corresponds to a next transmission occasion in the multiple transmission occasions subsequent to the first transmission occasion, for example, as shown in the scheme 900 described above with respect to FIG. 9.

In an embodiment, the first wireless communication device determines that the LBT passes during a last transmission occasion in a group of contiguous transmission occasions of the multiple transmission occasions. The first wireless communication device transmits the random access message in a first transmission occasion of the multiple transmission occasions subsequent to the group of contiguous transmission occasions. In other words, the first wireless communication device discards the last transmission occasion without using the remaining time in the last transmission occasion as shown in the scheme 1000 described above with respect to FIG. 10.

Figure 17:
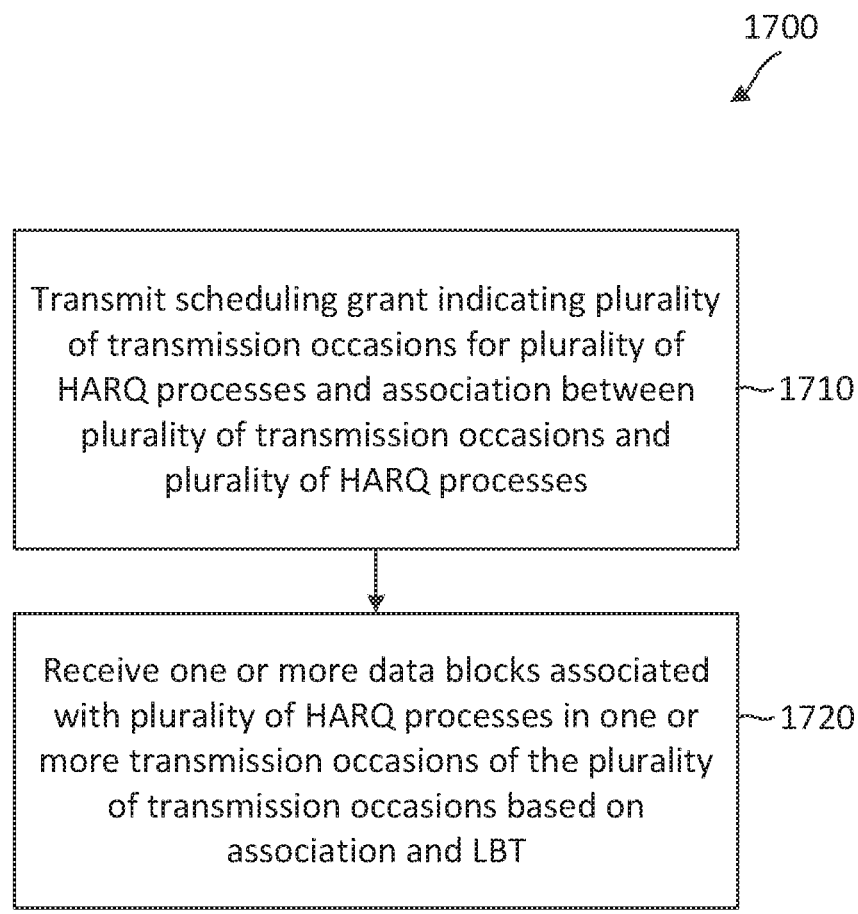
FIG. 17 is a flow diagram of a communication method according to some embodiments of the present disclosure.

FIG. 17 is a flow diagram of a communication method 1700 according to some embodiments of the present disclosure. Steps of the method 1700 can be executed by a computing device (e.g., a processor, processing circuit, and/or other suitable component) of a wireless communication device or other suitable means for performing the steps. For example, a wireless communication device, such as the BS 105 or the BS 500, may utilize one or more components, such as the processor 502, the memory 504, the multi-grant scheduling module 507, the random access module 508, the HARQ module 509, the transceiver 510, the modem 512, and the one or more antennas 516, to execute the steps of method 1700. The method 1700 may employ similar mechanisms as in the schemes 1100, 1200, 1300, and/or 1400 described above with respect to FIGS. 11, 12, 13, and 14, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1710, the method 1700 includes transmitting, by a BS (e.g., the BS 105 or the BS 500) to a UE (e.g., the BS 115 or the UE 400), a scheduling grant (e.g., the grants 1110, 1210, and/or 1310) indicating a plurality of transmission occasions (e.g., the HARQ transmission occasions 1120, 1220, and/or 1230) for a plurality of HARQ processes (e.g., the HARQ processes 312) and an association between the plurality of transmission occasions and the plurality of HARQ processes.

At step 1720, the method 1700 includes receiving, by the BS from the UE, one or more data blocks (e.g., the HARQ data blocks 1130, 1230, 1330, and/or 1430) associated with the plurality of HARQ processes in one or more transmission occasions of the plurality of transmission occasions based on the association and an LBT (e.g., the LBTs 1150, 1250, 1350, and/or 1450).

Figure 18:
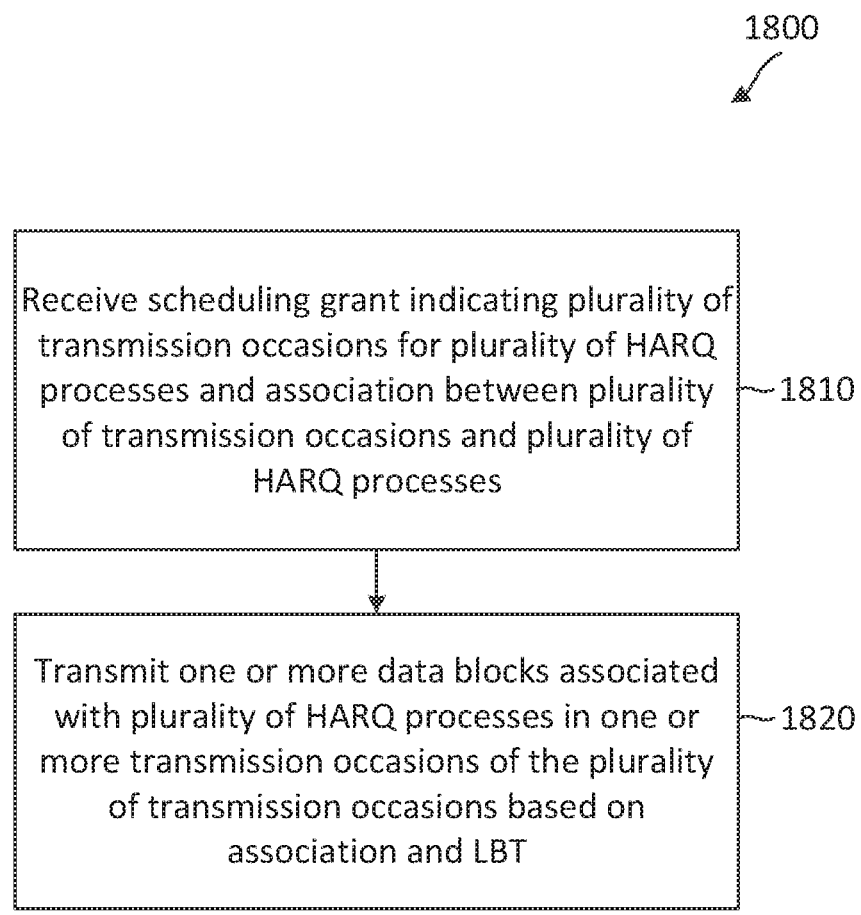
FIG. 18 is a flow diagram of a communication method according to some embodiments of the present disclosure.

FIG. 18 is a flow diagram of a communication method 1800 according to some embodiments of the present disclosure. Steps of the method 1800 can be executed by a computing device (e.g., a processor, processing circuit, and/or other suitable component) of a wireless communication device or other suitable means for performing the steps. For example, a wireless communication device, such as the UE 115, UE 202, UE 302, or UE 400, may utilize one or more components, such as the processor 402, the memory 404, the multi-grant-based transmission module 407, the random access module 408, the HARQ module 409, the transceiver 410, the modem 412, and the one or more antennas 416, to execute the steps of method 1800. The method 1800 may employ similar mechanisms as in the schemes 1100, 1200, 1300, and/or 1400 described above with respect to FIGS. 11, 12, 13, and 14, respectively. As illustrated, the method 1600 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes receiving, by a UE (e.g., the UE 115 or the UE 400) from a BS (e.g., the BS 105 or the BS 500), a scheduling grant (e.g., the grants 1110, 1210, and/or 1310) indicating a plurality of transmission occasions (e.g., the HARQ transmission occasions 1120, 1220, and/or 1230) for a plurality of HARQ processes (e.g., the HARQ processes 312) and an association between the plurality of transmission occasions and the plurality of HARQ processes.

At step 1820, the method 1800 includes performing, by the UE an LBT (e.g., the LBTs 1150, 1250, 1350, and/or 1450).

At step 1830, the method 1800 includes transmitting, by the UE from the BS, one or more data blocks (e.g., the HARQ data blocks 1130, 1230, 1330, and/or 1430) associated with the plurality of HARQ processes in one or more transmission occasions of the plurality of transmission occasions based on the association and the LBT.

In an embodiment, a first wireless communication device may implement the method 1700 or the method 1800 described above with respect to FIG. 17 or 18, respectively. For example, the first wireless communication device communicates, with a second wireless communication device, a scheduling grant (e.g., the grants 1110, 1210, and/or 1310) indicating a plurality of transmission occasions (e.g., the HARQ transmission occasions 1120, 1220, and/or 1230) for a plurality of HARQ processes (e.g., the HARQ processes 312) and an association between the plurality of transmission occasions and the plurality of HARQ processes. The first wireless communication device communicates, with a second wireless communication device, one or more data blocks (e.g., the HARQ data blocks 1130, 1230, 1330, and/or 1430) associated with the plurality of HARQ processes in one or more transmission occasions of the plurality of transmission occasions based on the association and an LBT. In an embodiment, the first wireless communication device corresponds to a BS (e.g., the BSs 105, 204, 304, and/or 500) and the second wireless communication device corresponds to a UE (e.g., the UEs 115, 202, 302, and/or 400). In such an embodiment, the first wireless communication device transmits the scheduling grant to the second wireless communication device and receives the one or more data blocks from the second wireless communication device. In an embodiment, the first wireless communication device corresponds to a UE (e.g., the UEs 115, 202, 302, and/or 400) and the second wireless communication device corresponds to a BS (e.g., the BSs 105, 204, 304, and/or 500). In such an embodiment, the first wireless communication device receives the scheduling grant from the second wireless communication device and transmits the one or more data blocks to the second wireless communication device.

In an embodiment, the scheduling grant indicates a number of transmission occasions for each HARQ process of the plurality of HARQ processes. In an embodiment, the association associates each transmission occasion of the plurality of transmission occasions with one HARQ process of the plurality of HARQ processes.

In an embodiment, the scheduling grant indicates two or more transmission occasions of the plurality of transmission occasions for each HARQ process of the plurality of HARQ processes. In an embodiment, each of the two or more transmission occasions are associated with a same HARQ parameter configuration including at least one of a NDI or a RV. In an embodiment, the communicating the one or more data blocks includes communicating, by the first wireless communication device with the second wireless communication device, one data block for each HARQ process of the plurality of HARQ processes.

In an embodiment, the communicating the one or more data blocks includes communicating, by the first wireless communication device with the second wireless communication device, a first data block of a first HARQ process of the plurality of HARQ processes in a first transmission occasion of the plurality of transmission occasions associated with the first HARQ process. The first data block includes a punctured portion (e.g. the punctured portion 1132 and/or 1432) based on the LBT. The first wireless communication device communicates, with the second wireless communication device, a repetition of the first data block of the first HARQ process in a second transmission occasion of the plurality of transmission occasions associated with the first HARQ process. In an embodiment, the communicating the repetition of the first data block of the first HARQ process is further based on a duration of the punctured portion exceeding a threshold.

In an embodiment, each transmission occasion of the plurality of transmission occasions includes a same duration, for example, as shown in the scheme 1200 described above with respect to FIG. 12.

In an embodiment, a first transmission occasion of the plurality of transmission occasions includes a different duration than a second transmission occasion of the plurality of transmission occasions, for example, as shown in the scheme 1300 described above with respect to FIG. 13. In an embodiment, the first transmission occasion includes a shorter duration than the second transmission occasion and the second transmission occasion is subsequent to the first transmission occasion.

In an embodiment, the first wireless communication device identifies a COT period (e.g., the COT period 1412) based on a CAT4 LBT, where the plurality of transmission occasions is within the COT period. In an embodiment, the first wireless communication device determines that a first transmission occasion of the plurality of transmission occasions subsequent to the one or more transmission occasions is reclaimable based on at least one of a transmission start time of the one or more data blocks or a number of HARQ process in the plurality of HARQ processes. The first wireless communication device communicates, with a third wireless communication device, a communication (e.g., UL control information, UL data, DL control information, and/or DL data) during the first transmission occasion based on the determining. In an embodiment, the communicating the one or more data blocks includes communicating, by the first wireless communication device with the second wireless communication device, the one or more data blocks in an unlicensed frequency band. The first wireless communication device communicates, with the second wireless communication device, an indication of the transmission start time in a licensed frequency band.

Further embodiments of the present disclosure include a method of wireless communication. The method may also communicating, by a first wireless communication device with a second wireless communication device, a scheduling grant indicating multiple transmission occasions for a random access message. The method may also include communicating, by the first wireless communication device with the second wireless communication device, the random access message in one or more of the multiple transmission occasions based on a repetition configuration and a listen-before-talk (LBT).

In some aspects, the method may also include where the repetition configuration indicates a number of repetitions, and where the communicating the random access message includes communicating, by the first wireless communication device with the second wireless communication device, one or more transmissions of the random access message based on the number of repetitions, each of the one or more transmissions of the random access message communicated in one of the multiple transmission occasions. The communicating the random access message includes communicating, by the first wireless communication device with the second wireless communication device, two or more transmissions of the random access message in contiguous transmission occasions of the multiple transmission occasions. The communicating the scheduling grant includes communicating, by the first wireless communication device with the second wireless communication device, a random access response (RAR) including the scheduling grant and the repetition configuration. The method may also include communicating, by the first wireless communication device with the second wireless communication device, a radio resource control (RRC) message including the repetition configuration. The method may also include communicating, by the first wireless communication device with the second wireless communication device, a downlink control information (DCI) message including the repetition configuration. The communicating the random access message includes communicating, by the first wireless communication device with the second wireless communication device, a data block of the random access message in a first transmission occasion of the multiple transmission occasions, the data block including a punctured portion based on the LBT; and communicating, by the first wireless communication device with the second wireless communication device, a repetition of the data block in a second transmission occasion of the multiple transmission occasions, where the second transmission occasion is subsequent to the first transmission occasion. The communicating the repetition of the data block is further based on a duration of the punctured portion exceeding a threshold. The second transmission occasion is spaced apart from the first transmission occasion. The first transmission occasion corresponds to a last transmission occasion in a group of contiguous transmission occasions of the multiple transmission occasions. The second transmission occasion corresponds to a next transmission occasion in the multiple transmission occasions subsequent to the first transmission occasion. The first wireless communication device is a user equipment (UE), and where the second wireless communication device is a base station (BS). The method may also include performing, by the first wireless communication device, the LBT; determining, by the first wireless communication device, that the LBT passes during a last transmission occasion in a group of contiguous transmission occasions of the multiple transmission occasions; and transmitting, by the first wireless communication device, the random access message in a first transmission occasion of the multiple transmission occasions subsequent to the group of contiguous transmission occasions. The first wireless communication device is a base station (BS), and where the second wireless communication device is a user equipment (UE).

Further embodiments of the present disclosure include a method of wireless communication communicating, by a first wireless communication device with a second wireless communication device, a scheduling grant indicating a plurality of transmission occasions for a plurality of hybrid automatic repeat request (HARQ) processes; and an association between the plurality of transmission occasions and the plurality of HARQ processes. The method may also include communicating, by the first wireless communication device with the second wireless communication device, one or more data blocks associated with the plurality of HARQ processes in one or more transmission occasions of the plurality of transmission occasions based on the association and a listen-before-talk (LBT).

In some aspects, the method may also include where the scheduling grant indicates a number of transmission occasions for each HARQ process of the plurality of HARQ processes. The association associates each transmission occasion of the plurality of transmission occasions with one HARQ process of the plurality of HARQ processes. The scheduling grant indicates two or more transmission occasions of the plurality of transmission occasions for each HARQ process of the plurality of HARQ processes. The communicating the one or more data blocks includes communicating, by the first wireless communication device with the second wireless communication device, one data block for each HARQ process of the plurality of HARQ processes. Each of the two or more transmission occasions are associated with a same HARQ parameter configuration including at least one of a new data indicator (NDI) or a redundancy version (RV). The communicating the one or more data blocks includes communicating, by the first wireless communication device with the second wireless communication device, a first data block of a first HARQ process of the plurality of HARQ processes in a first transmission occasion of the plurality of transmission occasions associated with the first HARQ process, the first data block including a punctured portion based on the LBT; and communicating, by the first wireless communication device with the second wireless communication device, a repetition of the first data block of the first HARQ process in a second transmission occasion of the plurality of transmission occasions associated with the first HARQ process. The communicating the repetition of the first data block of the first HARQ process is further based on a duration of the punctured portion exceeding a threshold. Each transmission occasion of the plurality of transmission occasions includes a same duration. A first transmission occasion of the plurality of transmission occasions includes a different duration than a second transmission occasion of the plurality of transmission occasions. The first transmission occasion includes a shorter duration than the second transmission occasion, and where the second transmission occasion is subsequent to the first transmission occasion. The communicating the one or more data blocks includes communicating, by the first wireless communication device with the second wireless communication device in an unlicensed frequency band, the one or more data blocks. The method may also include further includes communicating, by the first wireless communication device with the second wireless communication device in a licensed frequency band, an indication of a transmission start time of the one or more data blocks. The first wireless communication device is a base station (bs), and where the second wireless communication device is a user equipment (UE). The plurality of transmission occasions is within the cot period. The method may also include determining, by the first wireless communication device, that a first transmission occasion of the plurality of transmission occasions subsequent to the one or more transmission occasions is reclaimable based on at least one of a transmission start time of the one or more data blocks or a number of HARQ process in the plurality of HARQ processes; and communicating, by the first wireless communication device with a third wireless communication device, a communication during the first transmission occasion based on the determining. The first wireless communication device is a user equipment (UE), and where the second wireless communication device is a base station (BS).

Further embodiments of the present disclosure include an apparatus including a transceiver configured to communicate, with a first wireless communication device, a scheduling grant indicating multiple transmission occasions for a random access message; and communicate, with the first wireless communication device, the random access message in one or more of the multiple transmission occasions based on a repetition configuration and a listen-before-talk (LBT).

In some aspects, the apparatus may also include where the repetition configuration indicates a number of repetitions, and where the transceiver configured to communicate the random access message is further configured to communicate, with the first wireless communication device, one or more transmissions of the random access message based on the number of repetitions, each of the one or more transmissions of the random access message communicated in one of the multiple transmission occasions. The transceiver configured to communicate the random access message is further configured to communicate, with the first wireless communication device, two or more transmissions of the random access message in contiguous transmission occasions of the multiple transmission occasions. The transceiver configured to communicate the scheduling grant is further configured to communicate, with the first wireless communication device, a random access response (RAR) including the scheduling grant and the repetition configuration. The transceiver is further configured to communicate, with the first wireless communication device, a radio resource control (RRC) message including the repetition configuration. The transceiver is further configured to communicate, with the first wireless communication device, a downlink control information (DCI) message including the repetition configuration. The transceiver configured to communicate the random access message is further configured to communicate, with the first wireless communication device, a data block of the random access message in a first transmission occasion of the multiple transmission occasions, the data block including a punctured portion based on the LBT; and communicate, with the first wireless communication device, a repetition of the data block in a second transmission occasion of the multiple transmission occasions, where the second transmission occasion is subsequent to the first transmission occasion. The repetition of the data block is communicated based on a duration of the punctured portion exceeding a threshold. The second transmission occasion is spaced apart from the first transmission occasion. The first transmission occasion corresponds to a last transmission occasion in a group of contiguous transmission occasions of the multiple transmission occasions. The second transmission occasion corresponds to a next transmission occasion in the multiple transmission occasions subsequent to the first transmission occasion. The apparatus may also include is a user equipment (UE), and where the first wireless communication device is a base station (BS). The transceiver is further configured to transmit the random access message in a first transmission occasion of the multiple transmission occasions subsequent to the group of contiguous transmission occasions. The apparatus may also include is a base station (BS), and where the first wireless communication device is a user equipment (UE).

Further embodiments of the present disclosure include an apparatus including a transceiver configured to communicate, with a first wireless communication device, a scheduling grant indicating a plurality of transmission occasions for a plurality of hybrid automatic repeat request (HARQ) processes; and an association between the plurality of transmission occasions and the plurality of HARQ processes. The apparatus may also include includes communicate, with the first wireless communication device, one or more data blocks associated with the plurality of HARQ processes in one or more transmission occasions of the plurality of transmission occasions based on the association and a listen-before-talk (LBT).

In some aspects, the apparatus may also include where the scheduling grant indicates a number of transmission occasions for each HARQ process of the plurality of HARQ processes. The association associates each transmission occasion of the plurality of transmission occasions with one HARQ process of the plurality of HARQ processes. The scheduling grant indicates two or more transmission occasions of the plurality of transmission occasions for each HARQ process of the plurality of HARQ processes. The transceiver configured to communicate the one or more data blocks is further configured to communicate, with the first wireless communication device, one data block for each HARQ process of the plurality of HARQ processes. Each of the two or more transmission occasions are associated with a same HARQ parameter configuration including at least one of a new data indicator (NDI) or a redundancy version (RV). The transceiver configured to communicate the one or more data blocks is further configured to communicate, with the first wireless communication device, a first data block of a first HARQ process of the plurality of HARQ processes in a first transmission occasion of the plurality of transmission occasions associated with the first HARQ process, the first data block including a punctured portion based on the LBT; and communicate, with the first wireless communication device, a repetition of the first data block of the first HARQ process in a second transmission occasion of the plurality of transmission occasions associated with the first HARQ process. The repetition of the first data block of the first HARQ process is communicated further based on a duration of the punctured portion exceeding a threshold. Each transmission occasion of the plurality of transmission occasions includes a same duration. A first transmission occasion of the plurality of transmission occasions includes a different duration than a second transmission occasion of the plurality of transmission occasions. The first transmission occasion includes a shorter duration than the second transmission occasion, and where the second transmission occasion is subsequent to the first transmission occasion. The transceiver configured to communicate the one or more data blocks is further configured to communicate, with the first wireless communication device in an unlicensed frequency band, the one or more data blocks and the transceiver is further configured to communicate, with the first wireless communication device in a licensed frequency band, an indication of a transmission start time of the one or more data blocks. The apparatus is a base station (BS), and where the first wireless communication device is a user equipment (UE). The plurality of transmission occasions is within the cot period. The transceiver is further configured to communicate, with a second wireless communication device, a communication during the first transmission occasion based on the determination that the first transmission occasion reclaimable. The apparatus may also include is a user equipment (UE), and where the first wireless communication device is a base station (BS).

Further embodiments of the present disclosure include a non-transitory computer-readable medium having program code recorded thereon. The non-transitory computer-readable medium includes code for causing a first wireless communication device to communicate, with a second wireless communication device, a scheduling grant indicating multiple transmission occasions for a random access message. The non-transitory computer-readable medium may also include code for causing the first wireless communication device to communicate, with the second wireless communication device, the random access message in one or more of the multiple transmission occasions based on a repetition configuration and a listen-before-talk (LBT).

In some aspects, the non-transitory computer-readable medium may also include where the repetition configuration indicates a number of repetitions, and where the code for causing the first wireless communication device to communicating the random access message is further configured to communicate, with the second wireless communication device, one or more transmissions of the random access message based on the number of repetitions, each of the one or more transmissions of the random access message communicated in one of the multiple transmission occasions. The code for causing the first wireless communication device to communicate the random access message is further configured to communicate, with the second wireless communication device, two or more transmissions of the random access message in contiguous transmission occasions of the multiple transmission occasions. The code for causing the first wireless communication device to communicate the scheduling grant is further configured to communicate, with the second wireless communication device, a random access response (RAR) including the scheduling grant and the repetition configuration. The non-transitory computer-readable medium may also include code for causing the first wireless communication device to communicate, with the second wireless communication device, a radio resource control (RRC) message including the repetition configuration. The non-transitory computer-readable medium may also include code for causing the first wireless communication device to communicate, with the second wireless communication device, a downlink control information (DCI) message including the repetition configuration. The code for causing the first wireless communication device to communicate the random access message is further configured to communicate, with the second wireless communication device, a data block of the random access message in a first transmission occasion of the multiple transmission occasions, the data block including a punctured portion based on the LBT; and communicate, with the second wireless communication device, a repetition of the data block in a second transmission occasion of the multiple transmission occasions, where the second transmission occasion is subsequent to the first transmission occasion. The code for causing the first wireless communication device to communicate the random access message is further configured to communicate, with the second wireless communication device, the repetition of the data block further based on a duration of the punctured portion exceeding a threshold. The second transmission occasion is spaced apart from the first transmission occasion. The first transmission occasion corresponds to a last transmission occasion in a group of contiguous transmission occasions of the multiple transmission occasions. The second transmission occasion corresponds to a next transmission occasion in the multiple transmission occasions subsequent to the first transmission occasion. The first wireless communication device is a user equipment (UE), and where the second wireless communication device is a base station (BS). The non-transitory computer-readable medium may also include code for causing the first wireless communication device to determine that the LBT passes during a last transmission occasion in a group of contiguous transmission occasions of the multiple transmission occasions; and code for causing the first wireless communication device to transmit the random access message in a first transmission occasion of the multiple transmission occasions subsequent to the group of contiguous transmission occasions. The first wireless communication device is a base station (BS), and where the second wireless communication device is a user equipment (UE).

Further embodiments of the present disclosure include a non-transitory computer-readable medium having program code recorded thereon code for causing a first wireless communication device to communicate, with a second wireless communication device, a scheduling grant indicating a plurality of transmission occasions for a plurality of hybrid automatic repeat request (HARQ) processes; and an association between the plurality of transmission occasions and the plurality of HARQ processes. The non-transitory computer-readable medium may also include code for causing the first wireless communication device to communicate, with the second wireless communication device, one or more data blocks associated with the plurality of HARQ processes in one or more transmission occasions of the plurality of transmission occasions based on the association and a listen-before-talk (LBT).

In some aspects, the non-transitory computer-readable medium may also include where the scheduling grant indicates a number of transmission occasions for each HARQ process of the plurality of HARQ processes. The association associates each transmission occasion of the plurality of transmission occasions with one HARQ process of the plurality of HARQ processes. The scheduling grant indicates two or more transmission occasions of the plurality of transmission occasions for each HARQ process of the plurality of HARQ processes. The code for causing the first wireless communication device to communicate the one or more data blocks is further configured to communicate, with the second wireless communication device, one data block for each HARQ process of the plurality of HARQ processes. Each of the two or more transmission occasions are associated with a same HARQ parameter configuration including at least one of a new data indicator (NDI) or a redundancy version (RV). The code for causing the first wireless communication device to communicate the one or more data blocks is further configured to communicate, with the second wireless communication device, a first data block of a first HARQ process of the plurality of HARQ processes in a first transmission occasion of the plurality of transmission occasions associated with the first HARQ process, the first data block including a punctured portion based on the LBT; and communicate, with the second wireless communication device, a repetition of the first data block of the first HARQ process in a second transmission occasion of the plurality of transmission occasions associated with the first HARQ process. The code for causing the first wireless communication device to communicate the one or more data blocks is further configured to communicate, with the second wireless communication device, the repetition of the first data block based on a duration of the punctured portion exceeding a threshold. Each transmission occasion of the plurality of transmission occasions includes a same duration. A first transmission occasion of the plurality of transmission occasions includes a different duration than a second transmission occasion of the plurality of transmission occasions. The first transmission occasion includes a shorter duration than the second transmission occasion, and where the second transmission occasion is subsequent to the first transmission occasion. The code for causing the first wireless communication device to communicate the one or more data blocks is further configured to communicate, with the second wireless communication device in an unlicensed frequency band, the one or more data blocks, and The non-transitory computer-readable medium may also include further includes code for causing the first wireless communication device to communicate, with the second wireless communication device in a licensed frequency band, an indication of a transmission start time of the one or more data blocks. The first wireless communication device is a base station (BS), and where the second wireless communication device is a user equipment (UE). The plurality of transmission occasions is within the cot period. The non-transitory computer-readable medium may also include code for causing the first wireless communication device to determine that a first transmission occasion of the plurality of transmission occasions subsequent to the one or more transmission occasions is reclaimable based on at least one of a transmission start time of the one or more data blocks or a number of HARQ process in the plurality of HARQ processes; and code for causing the first wireless communication device to communicate, with a third wireless communication device, a communication during the first transmission occasion based on the determining. The first wireless communication device is a user equipment (UE), and where the second wireless communication device is a base station (BS).

Further embodiments of the present disclosure include an apparatus including means for communicating, with a first wireless communication device, a scheduling grant indicating multiple transmission occasions for a random access message. The apparatus may also include means for communicating, with the first wireless communication device, the random access message in one or more of the multiple transmission occasions based on a repetition configuration and a listen-before-talk (LBT).

In some aspects, the apparatus may also include where the repetition configuration indicates a number of repetitions, and where the means for communicating the random access message is further configured to communicate, with the first wireless communication device, one or more transmissions of the random access message based on the number of repetitions, each of the one or more transmissions of the random access message communicated in one of the multiple transmission occasions. The means for communicating the random access message is further configured to communicate, with the first wireless communication device, two or more transmissions of the random access message in contiguous transmission occasions of the multiple transmission occasions. The means for communicating the scheduling grant is further configured to communicate, with the first wireless communication device, a random access response (RAR) including the scheduling grant and the repetition configuration. The apparatus may also include means for communicating, with the first wireless communication device, a radio resource control (RRC) message including the repetition configuration. The apparatus may also include means for communicating, with the first wireless communication device, a downlink control information (DCI) message including the repetition configuration. The means for communicating the random access message is further configured to communicate, with the first wireless communication device, a data block of the random access message in a first transmission occasion of the multiple transmission occasions, the data block including a punctured portion based on the LBT; and communicate, with the first wireless communication device, a repetition of the data block in a second transmission occasion of the multiple transmission occasions, where the second transmission occasion is subsequent to the first transmission occasion. The means for communicating the random access message is further configured to communicate, with the first wireless communication device, the repetition of the data block further based on a duration of the punctured portion exceeding a threshold. The second transmission occasion is spaced apart from the first transmission occasion. The first transmission occasion corresponds to a last transmission occasion in a group of contiguous transmission occasions of the multiple transmission occasions. The second transmission occasion corresponds to a next transmission occasion in the multiple transmission occasions subsequent to the first transmission occasion. The apparatus may also include is a user equipment (UE), and where the first wireless communication device is a base station (BS). The apparatus may also include means for determining that the LBT passes during a last transmission occasion in a group of contiguous transmission occasions of the multiple transmission occasions; and means for transmitting the random access message in a first transmission occasion of the multiple transmission occasions subsequent to the group of contiguous transmission occasions. The apparatus may also include is a base station (BS), and where the first wireless communication device is a user equipment (UE).

Further embodiments of the present disclosure include an apparatus including means for communicating, with a first wireless communication device, a scheduling grant indicating a plurality of transmission occasions for a plurality of hybrid automatic repeat request (HARQ) processes; and an association between the plurality of transmission occasions and the plurality of HARQ processes. The apparatus may also include means for communicating, with the first wireless communication device, one or more data blocks associated with the plurality of HARQ processes in one or more transmission occasions of the plurality of transmission occasions based on the association and a listen-before-talk (LBT).

In some aspects, the apparatus may also include where the scheduling grant indicates a number of transmission occasions for each HARQ process of the plurality of HARQ processes. The association associates each transmission occasion of the plurality of transmission occasions with one HARQ process of the plurality of HARQ processes. The scheduling grant indicates two or more transmission occasions of the plurality of transmission occasions for each HARQ process of the plurality of HARQ processes. The means for communicating the one or more data blocks is further configured to communicate, with the first wireless communication device, one data block for each HARQ process of the plurality of HARQ processes. Each of the two or more transmission occasions are associated with a same HARQ parameter configuration including at least one of a new data indicator (NDI) or a redundancy version (RV). The means for communicating the one or more data blocks is further configured to communicate, with the first wireless communication device, a first data block of a first HARQ process of the plurality of HARQ processes in a first transmission occasion of the plurality of transmission occasions associated with the first HARQ process, the first data block including a punctured portion based on the LBT; and communicate, with the first wireless communication device, a repetition of the first data block of the first HARQ process in a second transmission occasion of the plurality of transmission occasions associated with the first HARQ process. The means for communicating the one or more data blocks is further configured to communicate, with the first wireless communication device, the repetition of the first data block based on a duration of the punctured portion exceeding a threshold. Each transmission occasion of the plurality of transmission occasions includes a same duration. A first transmission occasion of the plurality of transmission occasions includes a different duration than a second transmission occasion of the plurality of transmission occasions. The first transmission occasion includes a shorter duration than the second transmission occasion, and where the second transmission occasion is subsequent to the first transmission occasion. The means for communicating the one or more data blocks is further configured to communicate, with the first wireless communication device in an unlicensed frequency band, the one or more data blocks, and The apparatus may also include further includes means for communicating, with the first wireless communication device in a licensed frequency band, an indication of a transmission start time of the one or more data blocks. The apparatus may also include is a base station (BS), and where the first wireless communication device is a user equipment (UE). The plurality of transmission occasions is within the cot period. The apparatus may also include means for determining that a first transmission occasion of the plurality of transmission occasions subsequent to the one or more transmission occasions is reclaimable based on at least one of a transmission start time of the one or more data blocks or a number of HARQ process in the plurality of HARQ processes; and means for communicating, with a second wireless communication device, a communication during the first transmission occasion based on the determining. The apparatus may also include is a user equipment (UE), and where the first wireless communication device is a base station (BS).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), an uplink (UL) scheduling grant indicating one or more transmission occasions for a first HARQ process of a plurality of HARQ processes;
   performing a category 2 (CAT2) listen-before-talk (LBT) based on the one or more transmission occasions being within a channel occupancy time (COT) of the BS;
   transmitting one or more UL transmissions comprising a first UL data block of the first HARQ process during a first transmission occasion of the one or more transmission occasions based on the CAT2 LBT, the first UL data block including a punctured portion; and
   transmitting multiple repetitions of the first UL data block of the first HARQ process in transmission occasions of the one or more transmission occasions associated with the first HARQ process.

2. The method of claim 1, wherein the transmitting the one or more UL transmissions comprises:
   transmitting a first UL transmission of the one or more UL transmissions during the first transmission occasion of the one or more transmission occasions based on the CAT2 LBT; and
   transmitting a second UL transmission of the one or more UL transmissions during a second transmission of the one or more transmission occasions without performing any LBT based on the first transmission occasion and second transmission occasion being contiguous transmission occasions.

3. The method of claim 1, wherein the UL scheduling grant indicates an association between the one or more transmission occasions and the plurality of HARQ processes.

4. The method of claim 3, wherein the UL scheduling grant indicates multiple transmission occasions of the one or more transmission occasions for the first HARQ process of the plurality of HARQ processes, and wherein the transmitting the one or more UL transmission comprises:
   transmitting at least one UL data block of the first HARQ process in one of the multiple transmission occasions.

5. The method of claim 4, wherein each of the multiple transmission occasions are associated with a same HARQ parameter configuration including at least one of a new data indicator (NDI) or a redundancy version (RV).

6. The method of claim 1, wherein the transmitting the one or more UL transmission comprises:
   transmitting the multiple repetitions of the first UL data block of the first HARQ process based on a duration of the punctured portion exceeding a threshold.

7. The method of claim 1, wherein each transmission occasion of the one or more transmission occasions includes a same duration.

8. The method of claim 1, wherein the first transmission occasion of the one or more transmission occasions includes a different duration than a second transmission occasion of the one or more transmission occasions.

9. The method of claim 8, wherein the first transmission occasion includes a shorter duration than the second transmission occasion, and wherein the second transmission occasion is subsequent to the first transmission occasion.

10. The method of claim 1, wherein:
    the transmitting the one or more UL transmissions comprises:
    transmitting, in an unlicensed frequency band, the one or more UL transmissions, and
    the method further comprises:
    transmitting, in a licensed frequency band, an indication of a transmission start time of the one or more UL transmissions.

11. The method of claim 1, further comprising:
    performing a category 4 (CAT4) LBT for a transmission occasion outside the COT of the BS;
    transmitting another uplink transmission based on the CAT4 LBT; and
    determining to perform the CAT2 LBT for the one or more UL transmissions within the COT of the BS based on the one or more transmission occasions being within the COT of the BS.

12. A user equipment (UE) comprising:
    a transceiver configured to:
    receive, from a base station (BS), an uplink (UL) scheduling grant indicating one or more transmission occasions for a first HARQ process of a plurality of HARQ processes;
    transmit one or more UL transmissions comprising a first UL data block of the first HARQ process during a first transmission occasion of the one or more transmission occasions based on a category 2 (CAT2) listen-before-talk (LBT), the first UL data block including a punctured portion; and
    transmit multiple repetitions of the first UL data block of the first HARQ process in transmission occasions of the one or more transmission occasions associated with the first HARQ process; and
    a processor configured to:
    perform the CAT2 LBT based on the one or more transmission occasions being within a channel occupancy time (COT) of the BS.

13. The UE of claim 12, wherein the transceiver configured to transmit the one or more UL transmissions is configured to:
    transmit a first UL transmission of the one or more UL transmissions during the first transmission occasion of the one or more transmission occasions based on the CAT2 LBT; and
    transmit a second UL transmission of the one or more UL transmissions during a second transmission of the one or more transmission occasions without performing any LBT based on the first transmission occasion and second transmission occasion being contiguous transmission occasions.

14. The UE of claim 12, wherein the UL scheduling grant indicates an association between the one or more transmission occasions and the plurality of HARQ processes.

15. The UE of claim 14, wherein the UL scheduling grant indicates multiple transmission occasions of the one or more transmission occasions for the first HARQ process of the plurality of HARQ processes, and wherein the transceiver configured to transmit the one or more UL transmission is configured to:
transmit at least one UL data block of the first HARQ process in one of the multiple transmission occasions.

16. The UE of claim 15, wherein each of the multiple transmission occasions are associated with a same HARQ parameter configuration including at least one of a new data indicator (NDI) or a redundancy version (RV).

17. The UE of claim 15, wherein the transceiver is further configured to:
transmit the multiple repetitions of the first UL data block of the first HARQ process based on a duration of the punctured portion exceeding a threshold.

18. The UE of claim 12, wherein each transmission occasion of the one or more transmission occasions includes a same duration.

19. The UE of claim 12, wherein the first transmission occasion of the one or more transmission occasions includes a different duration than a second transmission occasion of the one or more transmission occasions.

20. The UE of claim 12, wherein:
the transceiver configured to transmit the one or more UL transmissions is configured to:
transmit, in an unlicensed frequency band, the one or more UL transmissions, and
the transceiver is further configured to:
transmit, in a licensed frequency band, an indication of a transmission start time of the one or more UL transmissions.

21. The UE of claim 12, wherein the processor is further configured to:
perform a category 4 (CAT4) LBT for a transmission occasion outside the COT of the BS;
transmit another uplink transmission based on the CAT4 LBT; and
determine to perform the CAT2 LBT for the one or more UL transmissions within the COT of the BS based on the one or more transmission occasions being within the COT of the BS.

22. A non-transitory computer-readable medium having program code recorded thereon, the program code comprising:
code for causing a user equipment (UE) to receive, from a base station (BS), an uplink (UL) scheduling grant indicating one or more transmission occasions for a first HARQ process of a plurality of HARQ processes;
code for causing the UE to perform a category 2 (CAT2) listen-before-talk (LBT) based on the one or more transmission occasions being within a channel occupancy time (COT) of the BS;
code for causing the UE to transmit one or more UL transmissions comprising a first UL data block of the first HARQ process during a first transmission occasion of the one or more transmission occasions based on the CAT2 LBT, the first UL data block including a punctured portion; and
code for causing the UE to transmit multiple repetitions of the first UL data block of the first HARQ process in transmission occasions of the one or more transmission occasions associated with the first HARQ process.

23. The non-transitory computer-readable medium of claim 22, wherein the code for causing the UE to transmit the one or more UL transmissions is configured to:
transmit a first UL transmission of the one or more UL transmissions during the first transmission occasion of the one or more transmission occasions based on the CAT2 LBT; and
transmit a second UL transmission of the one or more UL transmissions during a second transmission of the one or more transmission occasions without performing any LBT based on the first transmission occasion and second transmission occasion being contiguous transmission occasions.

24. The non-transitory computer-readable medium of claim 22, wherein the UL scheduling grant indicates:
an association between the one or more transmission occasions and the plurality of HARQ processes.

25. The non-transitory computer-readable medium of claim 24, wherein the UL scheduling grant indicates multiple transmission occasions of the one or more transmission occasions for the first HARQ process of the plurality of HARQ processes, and wherein the code for causing the UE to transmit the one or more UL transmission is configured to:
transmit at least one UL data block of the first HARQ process in one of the multiple transmission occasions.

26. The non-transitory computer-readable medium of claim 25, wherein each of the multiple transmission occasions are associated with a same HARQ parameter configuration including at least one of a new data indicator (NDI) or a redundancy version (RV).

27. The non-transitory computer-readable medium of claim 22, wherein the code for causing the UE to transmit the multiple repetitions of the first UL data block of the first HARQ process comprises code for causing the UE to transmit the multiple repetitions of the first UL data block of the first HARQ process based on a duration of the punctured portion exceeding a threshold.

28. The non-transitory computer-readable medium of claim 22, wherein:
the code for causing the UE to transmit the one or more UL transmissions comprises code for causing the UE to transmit, in an unlicensed frequency band, the one or more UL transmissions, and
the non-transitory computer-readable medium further comprises:
code for causing the UE to transmit, in a licensed frequency band, an indication of a transmission start time of the one or more UL transmissions.

29. The non-transitory computer-readable medium of claim 22, further comprising:
code for causing the UE to perform a category 4 (CAT4) LBT for a transmission occasion outside the COT of the BS;
code for causing the UE to transmit another uplink transmission based on the CAT4 LBT; and
code for causing the UE to determine to perform the CAT2 LBT for the one or more UL transmissions within the COT of the BS based on the one or more transmission occasions being within the COT of the BS.

* * * * *